US007339614B2

(12) United States Patent
Gruber et al.

(10) Patent No.: US 7,339,614 B2
(45) Date of Patent: Mar. 4, 2008

(54) LARGE FORMAT CAMERA SYSTEM WITH MULTIPLE COPLANAR FOCUSING SYSTEMS

(75) Inventors: Michael A. Gruber, Graz (AT); Franz W. Leberl, Graz (AT); Martin Ponticelli, Graz (AT)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/371,210

(22) Filed: Mar. 7, 2006

(65) Prior Publication Data

US 2006/0215038 A1    Sep. 28, 2006

Related U.S. Application Data

(62) Division of application No. 10/140,532, filed on May 6, 2002, now Pat. No. 7,009,638.

(60) Provisional application No. 60/289,008, filed on May 4, 2001.

(51) Int. Cl.
*H04N 5/225* (2006.01)
*H04N 9/097* (2006.01)
*H04N 1/387* (2006.01)
*H04N 7/18* (2006.01)
*G06K 9/32* (2006.01)

(52) U.S. Cl. ............... 348/218.1; 348/144; 348/147; 348/262; 358/450; 382/294

(58) Field of Classification Search ........... 348/218.1, 348/144, 147, 262, 117, 123, 145, 146, 159, 348/263, 264, 265, 267, 268; 382/294, 295, 382/297, 299; 358/540
See application file for complete search history.

(56) References Cited

U.S. PATENT DOCUMENTS

| | | | | |
|---|---|---|---|---|
| 4,323,925 A * | 4/1982 | Abell et al. | ................. | 348/340 |
| 4,689,748 A * | 8/1987 | Hofmann | .................... | 348/117 |
| 4,809,061 A * | 2/1989 | Suzuki | ....................... | 348/308 |
| 5,016,109 A * | 5/1991 | Gaylord | .................. | 348/218.1 |
| 5,317,394 A * | 5/1994 | Hale et al. | .................. | 348/147 |
| 5,604,534 A * | 2/1997 | Hedges et al. | .............. | 348/117 |
| 5,757,423 A * | 5/1998 | Tanaka et al. | ........... | 348/218.1 |
| 5,942,746 A * | 8/1999 | Tsai | ....................... | 250/208.1 |
| 6,433,815 B1 * | 8/2002 | Sandau et al. | ............. | 348/145 |
| 6,473,119 B1 * | 10/2002 | Teuchert | .................... | 348/144 |
| 7,006,132 B2 * | 2/2006 | Pereira et al. | ........... | 348/218.1 |
| 7,123,298 B2 * | 10/2006 | Schroeder et al. | ....... | 348/218.1 |
| 7,215,364 B2 * | 5/2007 | Wachtel et al. | .......... | 348/218.1 |
| 7,268,804 B2 * | 9/2007 | Chen et al. | .............. | 348/218.1 |
| 2002/0012071 A1* | 1/2002 | Sun | .......................... | 348/578 |
| 2002/0024606 A1* | 2/2002 | Yuki et al. | ............... | 348/218.1 |
| 2002/0085094 A1* | 7/2002 | Teuchert | .................... | 348/144 |
| 2007/0188610 A1* | 8/2007 | Micotto et al. | ............. | 348/144 |

\* cited by examiner

*Primary Examiner*—John M. Villecco

(57) ABSTRACT

Large format, digital camera systems (10, 100, 150, 250, 310) expose single detector arrays 20 with multiple lens systems (12, 14, 16, 18) or multiple detector arrays (104, 106, 108, 110, 112, 114, 116, 118, 120, 152, 162, 172, 182, 252, 262, 272, 282, 322, 324) with one or more single lens systems (156, 166, 176, 186) to acquire sub-images of overlapping sub-areas of large area objects. The sub-images are stitched together to form a large format, digital, macro-image (80, 230", 236", 238", 240"), which can be colored. Dampened camera carrier (400) and accelerometer (404) signals with double-rate digital signal processing (306, 308) are used.

7 Claims, 15 Drawing Sheets

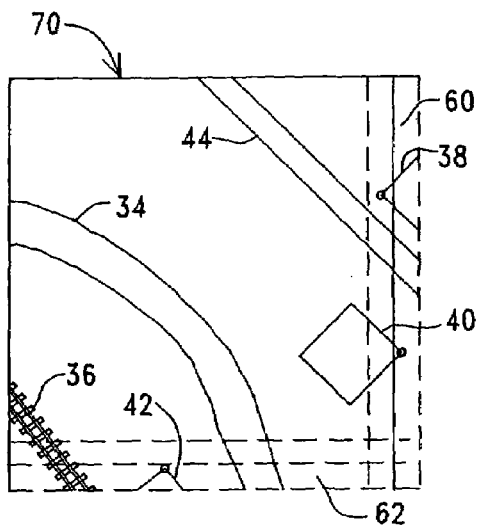
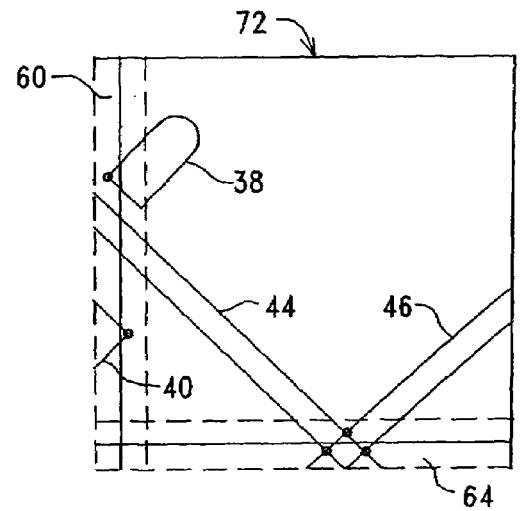
FIG.2a          FIG.2b
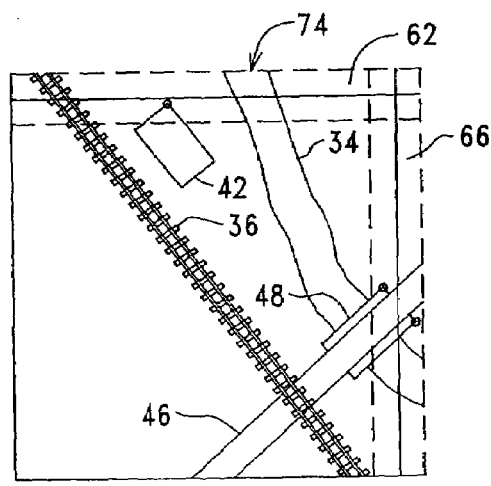
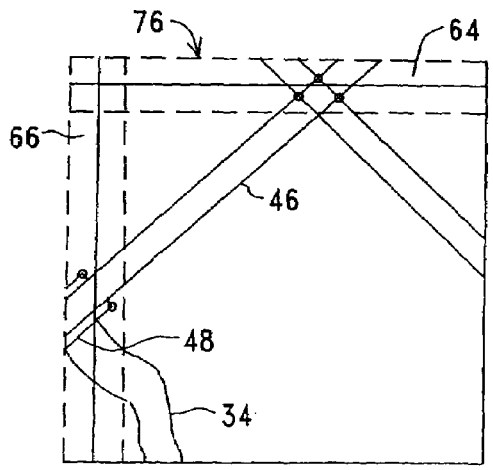
FIG.2c          FIG.2d

LARGE FORMAT CAMERA SYSTEM WITH MULTIPLE COPLANAR FOCUSING SYSTEMS

REFERENCE TO RELATED APPLICATION

This patent application claims the benefit of U.S. provisional patent application No. 60/289,008, filed in the United States Patent and Trademark Office on May 4, 2001, and is a divisional of U.S. patent application Ser. No. 10/140,532, filed on May 6, 2002 now U.S. Pat No. 7,009,638, each of which is incorporated herein by reference.

BACKGROUND OF THE INVENTION

1. Technical Field

This invention is related generally to photogrammetry and more specifically to large format digital cameras for acquiring images of large area objects or large areas of large objects, such as aerial images of portions of the surface of the earth.

2. Background Art

It is often desirable to photograph or otherwise acquire digital images of large areas of objects, but in large formats to enhance geometric resolution, i.e., ability to distinguish geometric details for visual inspection or analysis. For example, it is easy to get a picture of a mountain with a digital camera by backing far enough away from the mountain until the entire mountain fits within the field of view of camera lens, set the focus at infinity, and push the button on the camera to take the picture. The resulting picture of the mountain, which, when processed and printed, can be held in a person's hand and pasted onto a page in a scrap book, may appear to be sharp and clear, but it may not be possible to discern an individual house built on the side of the mountain in the picture because the house is too small. Expanding or "blowing up" the picture to a larger size might make it possible to discern the house, but it may still be impossible to see the doors, windows, roof lines, and other details of the house because the resolution of such fine details just might not be in the picture.

If the camera could have a larger field of view, such as a wider angle lens, so that it would not have to be backed so far away from the mountain to fit the view of the mountain within the field of view of the lens, some enhancement of details, i.e., higher geometric resolution, could be obtained. Such wide angle lenses, sometimes called "fisheye" lenses, are well-known, but they also distort the image—magnifying portions in the middle and diminishing marginal portions of the image.

Geometric resolution obtainable by digital cameras is also limited by the sizes of photodetector arrays. Images are detected in digital cameras by focusing light of an image onto an array of photodetector devices, such as charge-coupled devices (CCD's). Each photodetector in the array produces an electric signal, the voltage or current of which is a function of the intensity of all the light that is focused onto that photodetector. Thus, if all of the light reflected by the house in the above-described mountain scene is focused onto one photodetector, the electric signal (voltage or current) level produced by that photodetector will be indicative of the average light energy reflected from the entire house. Therefore, such signal output might enable one to discern that there is something in the resulting mountain picture where the house is located, but it would not be able to produce a recognizable house shape, much less details of doors, windows, roof lines, and the like. Furthermore, no amount of enlargement or "blowing up" of the picture could produce more detail. It would just produce a larger spot in a larger image of the mountain scene, because the resolution is limited to a single electric signal for the entire house.

On the other hand, if the light reflected from the house could be focused onto an array of tens or even hundreds or thousands of individual photodetectors, so that light reflected from a window, for example, is focused on one or more individual photodetectors, while light reflected from doors, walls, and different roof sections of the house could be focused on other respective multitudes of individual photodetectors, then individual electric signals indicative of light energies reflected from each of those various parts or features of the house would be available for producing more details of the house in the image, i.e., there would be higher geometric resolution in the picture.

These same principles apply to aerial and other types of digital photography. For example, if in taking an aerial picture of a city, all of the light reflected from a city block is focused on one photodetector, it may be possible to discern the block in the resulting picture, but it would not be possible to discern individual buildings, back yards, alleys, cars in driveways, and the like. However, focusing the light reflected from the city block onto an array of hundreds or even thousands of photodetectors would enable geometric resolution capable of discerning such details in the city block.

A problem faced by digital camera manufacturers is that large photodetector arrays, to the extent they are commercially available, are not inexpensive. Therefore, most camera designers and manufacturers are limited to commonly available photodetector arrays. Rectangular array sizes of about 1,000×1,000, i.e., about 1,000,000, photodetectors are now fairly common and readily available, while arrays of 5,000×5,000, i.e., about 25,000,000 photodetectors, or more are considered to be "large" and expensive. These array sizes are impressive compared to only a few years ago, and sizes of photodetector arrays will no doubt continue to grow in coming years. They are, none the less, still limited. Several high-end camera manufacturers do make digital cameras with 10,000×10,000 arrays, i.e., about 100,000,000 photodetectors, but the costs of such cameras are prohibitive fore most purposes. Therefore, most aerial photographers have to choose between setting their digital camera equipment to obtain pictures or images of large areas, such as entire cities or more, with low geometric resolution (i.e., ability to discern few details), or to obtain smaller area pictures or images, such as parts of cities, but with higher geometric resolution.

Besides cost, there are other limitations of such "large" array digital camera, especially as compared to analog cameras using film, which can generally achieve better geometric resolution than conventional digital cameras. For example, radiometric resolution, i.e., gray scale and/or color resolution, of analog film cameras generally not as good as that of digital cameras. On the other hand, large arrays of photodetectors often have defective detector elements that produce defective images. Also, their large size, and, especially the time it takes to read an image of a large array of photodetectors, are all significant problems. The read-out time alone can reduce their usefulness to situations in which there is no movement between the object and the camera, because such movement before all the electric signals from all the photodetectors in the array that can be read could introduce distortions in the resulting picture or image. Further, such large detectors for large format photogrammetry applications have to be nearly flawless, i.e., few, if any, bad photodetectors, because there is no redundancy, and bad photodetectors in the array will leave flaws in images being acquired by the detector array. The requirement for such flawlessness puts further pressure on cost of such cameras.

Other methods to overcome these limitations for acquiring larger format images of large area objects, such as macro- and micro-scanning cameras, also take time to create the image. Scanning cameras are ones in which a linear array of photodetectors is moved in the stationary image plane of a camera to cover the entire image format or view. A similar effect, but different method, is to move (rotate) the camera, usually in an arc about an axis that extends through the lens and is parallel to the scene or object and to the image plane. Cameras that use this latter technique of scanning the object by rotating the camera are called panoramic cameras. Both scanning cameras and panoramic cameras, as described above, also require that the object does not move in relation to the location of the camera, and vice versa, while the object is being scanned to collect the image.

Satellite imaging of the earth's surface or of surfaces of other planets, moons, and the like, has long come to rely on kinematic imaging with a scanning linear detector array, which has come to be known as "push-broom" scanning. In such "push-broom" scanning, the entire camera, including both the lens and the linear array of photodetectors, is mounted on the satellite and moves with the satellite in relation to the object, which is the earth's (or other planet or moon) surface. The image of the object (earth or other planet or moon surface), therefore, is collected in individual linear paths corresponding to the linear array of photodetectors being swept over the object, and a plurality of such paths are then assembled together to produce the image. In such "push-broom" scanning, the object (earth, etc.) must not "move" as it is being scanned, i.e., the satellite with the camera remains a fixed distance from the center of mass of the earth during the satellite's movement and scan of the earth's surface. The problem with such "push-broom" scanning is that it is difficult to know the camera path accurately, which results in a notorious lack of accuracy in stereo measurements or mensuration in the resulting images.

A recent aerial camera system developed by LH Systems, of Englewood, Colo., USA (now Leica Geosystems, of Atlanta, Ga., USA), which is similar to a 1969 doctoral dissertation of E. Derenyi and based on a system previously developed by the German Aerospace Establishment DLR for use on a Mars mission, uses multiple linear detector arrays, instead of film, in the image plane of a conventional high quality lens system to match or exceed performance of analog film-based cameras in aerial photogrammetric applications. As the aircraft or spacecraft flies over the object, each detector array produces a "push-broom" strip of imagery, but these "push-broom" strips are not geometrically independent, since the multiple image lines are collected simultaneously with the same camera. A point on the ground in the path of the multiple "push-broom" image acquisitions is imaged as many times as there are linear arrays in the camera. A problem is that each image line has a separate perspective center, so the resulting composite image of the object has many perspective centers.

A variation of this multiple linear array approach is shown in the Patent Cooperation Treaty (PCT) patent application no. PCT/DE00/01163 (International No. WO 00/66976) filed by W. Teuchert and W. Mayr, wherein the linear arrays are replaced by a plurality of small rectangular arrays to populate the focal image. Three groups of multiple detectors in each group are used, so that one group is forward-looking, one group is nadir (looking straight down), and the third group is rearward-looking. This camera is also mounted on an airplane or spacecraft, and, as it flies, the image taking is repeated rapidly so that spaces between images acquired by individual detectors in a group are filled or partially filled by images acquired by the next row of detectors in the group, etc., until the three group images are filled and synthesized together from the individual detectors in the group. This system requires the motion of the airplane or spacecraft, and it cannot be used to image a moving object. It also has the problem of multiple perspective centers.

Another approach to aerial imaging was announced recently by ZI, Inc., a subsidiary of Intergraph Corp. of Huntsville, Ala., USA, combines several cameras that take images simultaneously. Four cameras, i.e., four separate lens and sensor assemblies, mounted together produce four separate sub-images of the parts of the object that are in the respective fields of view of the four cameras. Each sub-image has its own perspective center, with each of the four optical centers being in the middle of its respective sub-image. A large-image format can be assembled from the sub-images, but accuracy can suffer because of differences among the multiple cameras, and it has the problem of multiple perspective centers—one for each camera.

SUMMARY DISCLOSURE OF THE INVENTION

Accordingly, a general object of this invention is to provide a method and camera apparatus that can produce high resolution, large format, digital images of large area objects.

A more specific object of the present invention is to provide a large format, digital camera system and method for acquiring large format, digital images of large area objects, but without the requirement and costs of large, expensive, detector arrays.

Another object of the present invention is to provide a large format, digital camera system and method for acquiring large format, digital images of objects that are either moving or stationary.

Another specific object of the present invention is to provide a method and camera apparatus for acquiring instantaneous, large format, digital images of an object so that movement of the object or of the camera apparatus does not cause blurring or distortion of the images.

Still another object of the present invention is to provide a method and camera apparatus for acquiring large format, digital images of a large area object inexpensively enough that there can be a degree of redundancy in order to produce high quality, large format, digital images without having to rely on flawless detector arrays.

Yet another object of the present invention is to provide a method and camera apparatus for acquiring large format, digital images of large area objects with fast and efficient digital data read-out and processing.

A further object of the present invention is to provide a method and camera apparatus with high resolution, wide angle geometry for a wide field of view and for good stereo digital imaging.

Another Object of this Invention is to Provide Large Format Digital Images of Large Area Objects in Color.

A still further object of the present invention is to provide a method and digital camera apparatus for producing a large image format that has a single perspective center.

Additional objects, advantages, and novel features of the invention are set forth in part in the description that follows and will become apparent to those skilled in the art upon examination of the following description and figures or may be learned by practicing the invention. Further, the objects and the advantages of the invention may be realized and attained by means of the instrumentalities and in combinations particularly pointed out in the appended claims.

To achieve the foregoing and other objects and in accordance with the purposes of the present invention, as embodied and broadly described herein, a method of this invention may comprise digital camera systems in which two-dimensional arrays are exposed to multiple portions or sub-areas of large area objects to acquire overlapping sub-images of such sub-areas. The digital sub-images can then be pieced or stitched together in a digital mosaic to form a digital macro-image of the large area object. In one embodiment of the invention, the sub-images can be acquired by a single, two-dimensional, detector array and exposed sequentially to the different sub-areas by different lens systems. In other embodiments, clusters comprising multiple, spaced apart, two-dimensional detector arrays are exposed to different sub-areas of the large area object by a single lens system either sequentially or simultaneously to acquire the overlapping sub-images.

In a preferred embodiment, a large format, digital camera system comprises more than one sub-camera system, and each sub-camera system has its own lens system with at least one detector array in the focal plane of each lens system. The lens systems have the same focal length and are mounted closely together in a manner that makes their focal planes coplanar and their optical axes parallel to each other. The detector array(s) of the different sub-cameras are exposed by the respective single lens systems of the sub-cameras to overlapping sub-areas of large area objects so that sub-images acquired by different sub-cameras have overlapping areas to facilitate piecing or stitching them together into a seamless macro-image of the large area object. If the large format, digital camera system moves in relation to the large area object, the shutters and image acquisition systems of the respective sub-cameras can be actuated in timed sequence coordinated with the speed of movement to make the perspective centers of the sub-camera images match the perspective centers of the other sub-camera images. Therefore, when the macro-image is pieced or stitched together from the sub-images, it has a single perspective center. If it does not move, the shutters and image acquisition systems can be actuated either sequentially or simultaneously, but the macro-image will have a plurality of perspective centers, i.e., one perspective center for the images acquired by each sub-camera system. Thus, a large format, digital camera comprising four sub-camera systems will, if not moving with shutters actuating in the timed sequence, have four perspective centers.

More detector arrays can be added to each sub-camera system to increase the format size of the large format, digital camera system, or the detector arrays can be larger to increase the format size without adding more sub-cameras. Of course, adding more sub-cameras can also increase format size.

Repeat image acquisition of the same object through different color filters to provide overlapping color sub-images can add color to the macro-image. Alternatively, addition of another sub-camera system with overlapping color detector arrays or near infrared arrays can add color or near infrared imaging capabilities. The color and/or near infrared arrays can be two-dimensional or, if the camera moves, linear, and the color and/or near infrared can, but does not have to, be less resolution than the monochromatic or panchromatic sub-image arrays, thus can have different focal lengths. The lower resolution color overlay is registered to the higher resolution monochromatic or panchromatic macro-image, and the high resolution monochromatic or panchromatic macro-image content is used to segment and enhance the quality of the color overlay.

The sub-image read-out from the various detector arrays is accomplished simultaneously in a parallel manner for speed. Digital correlated double sampling is used to convert the individual photodetector output signals twice per pixel using an analog to digital converter at the double sampling rate and to perform the subtraction of the residual reset signal to the actual light exposed signal in the digital domain. An accelerometer on a dampened camera carrier platform outputs signals during sub-image acquisition, which are used to evaluate vibration or movement magnitude. Sub-images are rejected and the shutter is re-actuated to re-acquire images in short order when the magnitude of vibrations or movement is large enough to degrade the sub-image quality.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the drawings:

FIGS. 2a-d illustrate a plurality of sub-images of overlapping sub-portions of the large area object acquired by the digital camera of FIG. 1;

DETAILED DESCRIPTIONS OF BEST MODES FOR CARRYING OUT THE INVENTION

Figure 1:
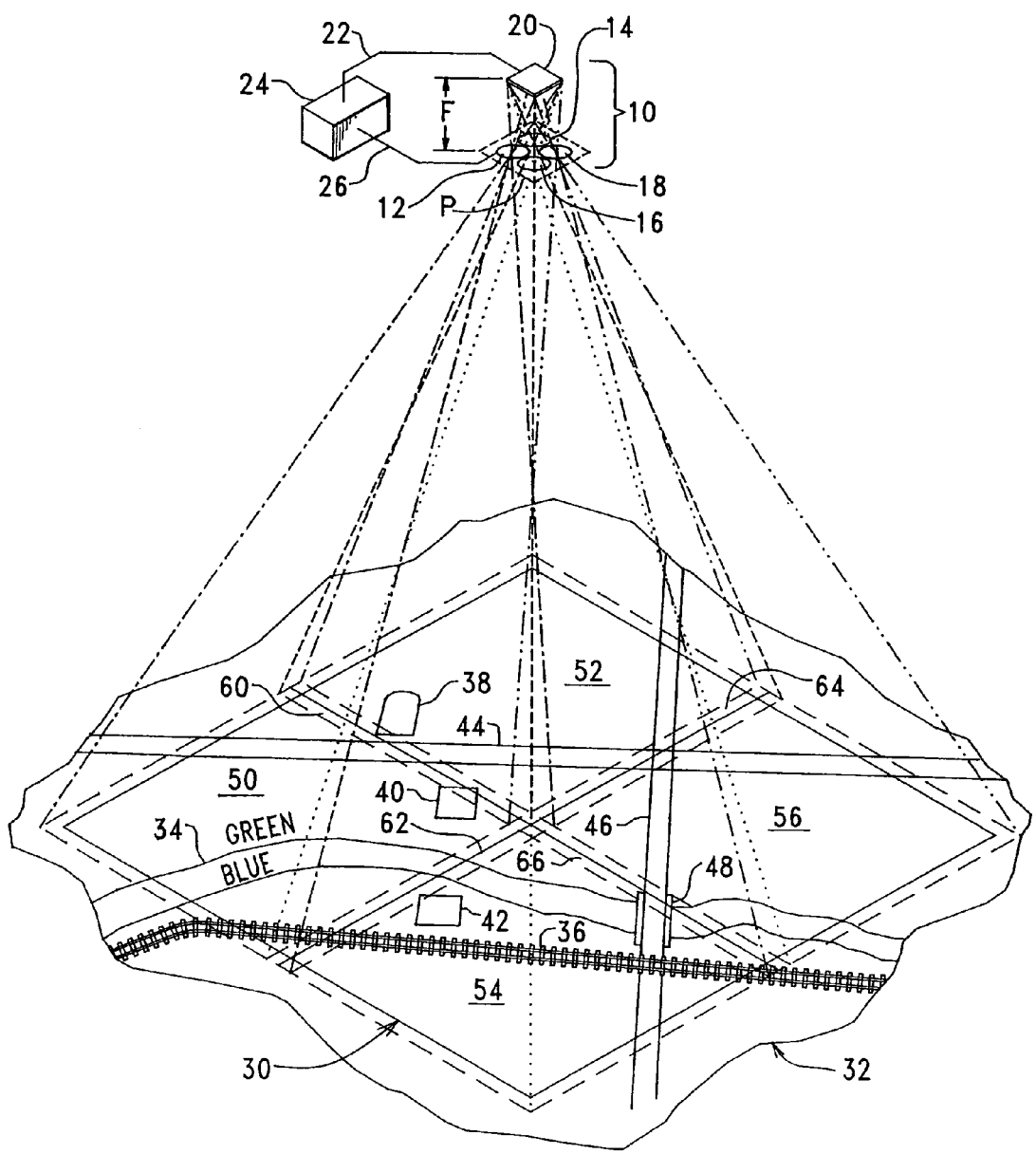
FIG. 1 is a perspective, diagrammatic, view of a digital camera with a single detector array and multiple lenses acquiring a large format image of a large area object according to this invention, such as, for example, an image of a geographical area of the earth with the digital camera mounted on a helicopter.

One of the simpler, yet effective, large format, digital camera systems of this invention is illustrated diagrammatically in FIG. 1. Essentially, the large area camera system 10 in FIG. 1 is represented by a plurality of lens systems 12, 14, 16, 18, all of which have the same focal length F and are positioned in a common plane P, and a photodetector array 20 positioned in the focal plane of the lens systems 12, 14, 16, 18, i.e., at a distance F from the plane P. The photodetector array 20 is connected electrically by suitable conductors 22 to a control circuit 24, which includes at least a microprocessor, input/output circuitry, memory, and power supply for driving the photodetector array 20, reading sub-image data out of the photodetector array 20, and storing such sub-image data. Other data processing functions, such as combining sub-images and/or image display functions, can be accomplished in the camera system 20 or with other peripheral data processing equipment.

The large format camera system 10 in FIG. 1 is illustrated simplistically in the process of acquiring a large format digital image (not shown in FIG. 1) of a large area 30 of an object 32, for example, a semi-developed geographical area on the earth's surface that includes a stream 34, railroad 36, three building structures 38, 40, 42, two cross streets 44, 46, and a bridge 48, where a cross street 46 crosses the stream 34. Of course, the components of the camera system 10, and large area 30 of the object 32 are not shown in actual sizes, proportions, or details, which would not be practical or even possible within the constraints of the drawing format, as would be understood by persons skilled in the art. Also, details of appropriate lens systems 12, 14, 16, 18, as well as detector array 20, and circuits 22 and 24 are shown only diagrammatically and not in detail. However, persons skilled in the art will readily understand how to design, fabricate, and assemble such components and systems, once they understand the principles of this invention as described herein.

Referring, now to FIG. 1 in combination with FIGS. 2a-d, the camera system 10 is shown with four lens systems 12, 14, 16, 18 positioned in the common plane P and configured to focus four parts or sub-areas 50, 52, 54, 56, respectively, of the large area 30 onto the detector array 20. However, any plurality of lens systems would work for purposes of this invention.

In FIG. 1, the first lens system 12 focuses a first sub-area 50 onto the detector array 20, and then the second lens system 14 focuses a second sub-area 52 onto the detector array 20, the third lens system 16 focuses a third sub-area 54 onto the detector array 20, and the fourth lens system 18 focuses a fourth sub-area 56 onto the detector array 20, all in sequential order. The lens systems 12, 14, 16, 18 are set so that marginal edge portions of the sub-areas 50, 52, 54, 56 overlap each other. Therefore, such overlapping marginal edge area 60 is common to sub-areas 50, 52. Likewise, overlapping marginal edge area 62 is common to sub-areas 50, 54, marginal edge area 64 is common to sub-areas 52, 56, and marginal edge area 66 is common to sub-areas 54, 56.

Each lens system 12, 14, 16, 18 includes a shutter that can be opened and closed independently of the other lens systems, so that the detector array 20 can be exposed to only one of the sub-areas 50, 52, 54, 56 at a time. The shutters and their actuators are not shown in FIG. 1 because of drawing size constraints, but shutters and shutter actuators are well-known to persons skilled in the art, who would be able to implement them without difficulty to practice this invention. Therefore, there is no need to describe shutters in lens systems or their actuators for purposes of describing this invention. Suffice it to say that such shutter actuators are connected to the control circuit 24 by suitable electric leads or conductors 26 so that read-out of image data from the detector array 20 can be coordinated with actuation of the respective shutters in lens systems 12, 14, 16, 18, as will be described in more detail below.

As the shutter in the first lens system is opened to expose the detector array 20, the control circuit 24 reads out the sub-image 70 (FIG. 2a) of sub-area 50 from the detector array 20. As is understood by persons skilled in the art, the detector array 20 comprises an array of individual photodetectors, e.g., semiconductor devices that output an electric signal, the magnitude of which is dependent on the intensity of light energy incident on such photodetector. Therefore, the signal from each photodetector in the array 20 is indicative of light energy intensity from a pixel area of the sub-area 50, and the signals from all of the individual photodetectors in the array are indicative of light energy intensity from all of the pixel areas of the sub-area 50. Therefore, the signals from the photodetectors in the detector array 20, together, are indicative of the pattern of light energy from the sub-area 50, so a sub-image 70 (FIG. 2) of the sub-area 50 can be produced from such signals. First, however, the signals are amplified, digitized, processed, and stored, as is well-known to persons skilled in the art.

After exposing the detector array 20 to the first sub-area 50 to acquire the sub-image 70 in digital form, as described above, the shutter for the second lens system 14 is actuated to acquire and store a sub-image 72 (FIG. 2b) of the sub-area 52 in digital form. Acquisitions of sub-image 74 (FIG. 2c) of sub-area 54 and of sub-image 76 (FIG. 2d) of sub-area 56 by lens system 16 and lens system 18, respectively, are accomplished in a similar manner. The read-out time for a detector array less than 5,000×5,000 is typically less than one second, such as about one-half a second.

When all of the overlapping sub-images 70, 72, 74, 76 have been acquired, they can be pieced together, as illustrated in FIGS. 3a-f to produce a large format, macro-image 80 (FIG. 3f) of the large area 30 of object 32 (sometimes referred to as the large area object 30). Such piecing together procedure is preferably performed in the digital format of the sub-images 70, 72, 74, 76 by software, similar to the procedure for stitching together adjacent digital images with overlapping marginal edge portions described in U.S. Pat. No. 6,122,078 and/or in co-pending U.S. patent application Ser. No. 09/187,254, both of which are incorporated herein by reference and made a part hereof as if they were recited in full. The preferred method is to use known or calculated mechanical measurements or relationships to piece the respective sub-images 70, 72, 74, 76 together on a pixel-by-pixel basis in a common, master X-Y coordinate system and then to use software-identifiable, distinct features or parts of features in the overlapping, marginal edge areas 60, 62, 64, 66 as guide markers for final pixel adjustments to align and "stitch" together the adjacent sub-images to form the large format, macro-image 80.

Figure 3A:
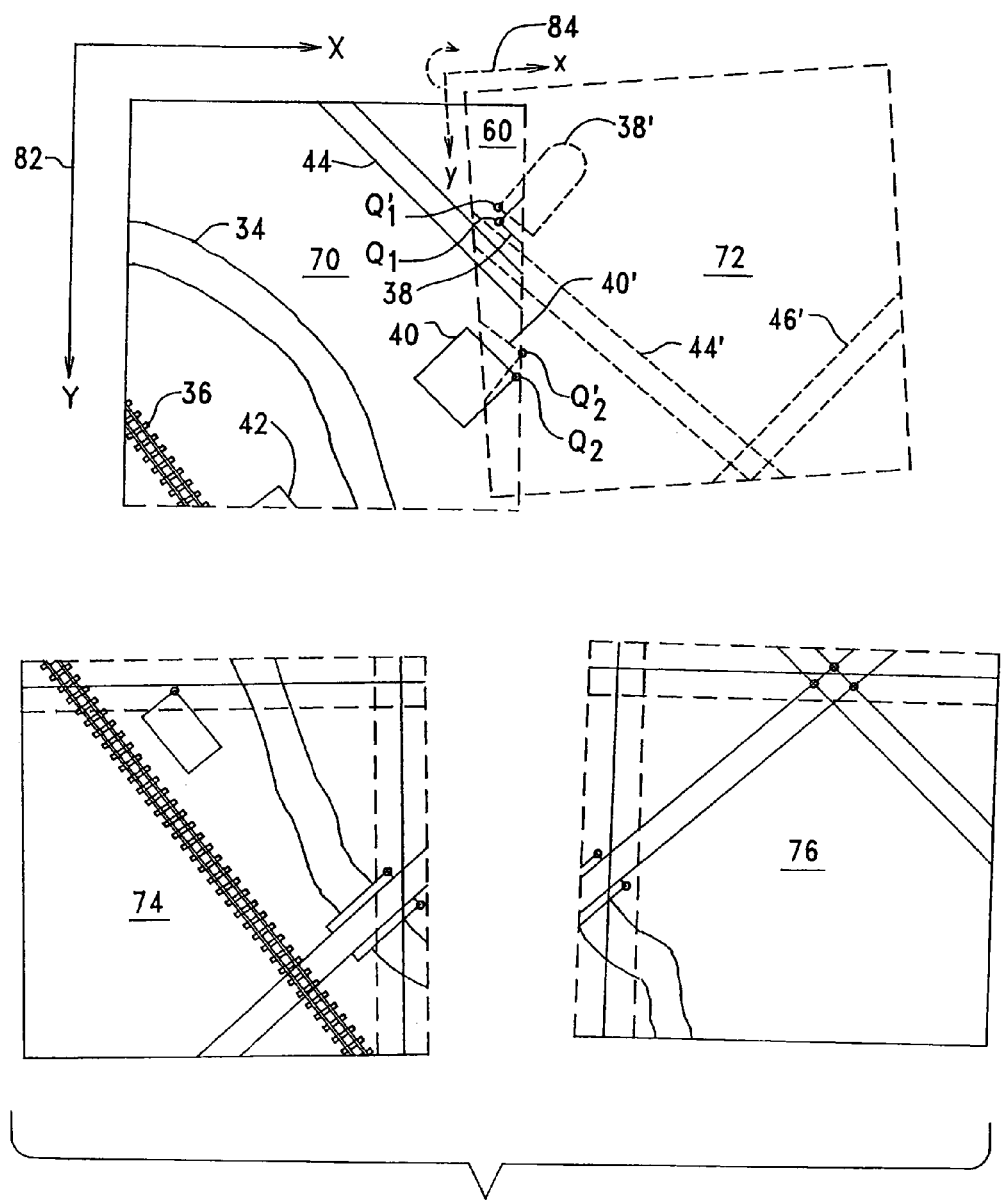
FIGS. 3a-f illustrate the process of stitching the sub-images of FIGS. 2a-d together into a large format macro-image.

As illustrated in FIG. 3a, one of the sub-images, for example sub-image 70, is chosen as the master sub-image, and its pixel array is chosen as the master X-Y coordinate system 82. For piecing the second sub-image 72 together with the first, or master, sub-image 70, it is first joined as closely as possible with known or measured mechanical dimensions and relationships based on relative positions and orientations of the respective lens systems 12, 14 (FIG. 1), size of the detector array 20, distances of the lens systems 12, 14, from the detector array 20 and the like. This initial placement of the second sub-image 72 by its pixel array coordinate system x-y is accurate enough to get very close to registering the common features 38, 40, 44 together in the overlapping marginal edge portion 60. Theoretically, the master coordinates of pixels of distinct features 38, 40, 44 in the first sub-image 70 should be very close to the same as the coordinates for pixels of those same features 38', 40', 44' in the second sub-image 72, because both of these sub-images 70, 72 are acquired with the same detector array 20 (FIG. 1). However, the parallaxes due to the different locations of the respective lens systems 12, 14 and other inaccuracies in measurements, lengths, and the like, cause slight variations or displacements between such features, e.g., features 38, 40, 44, as illustrated in FIG. 3a.

Figure 3B:
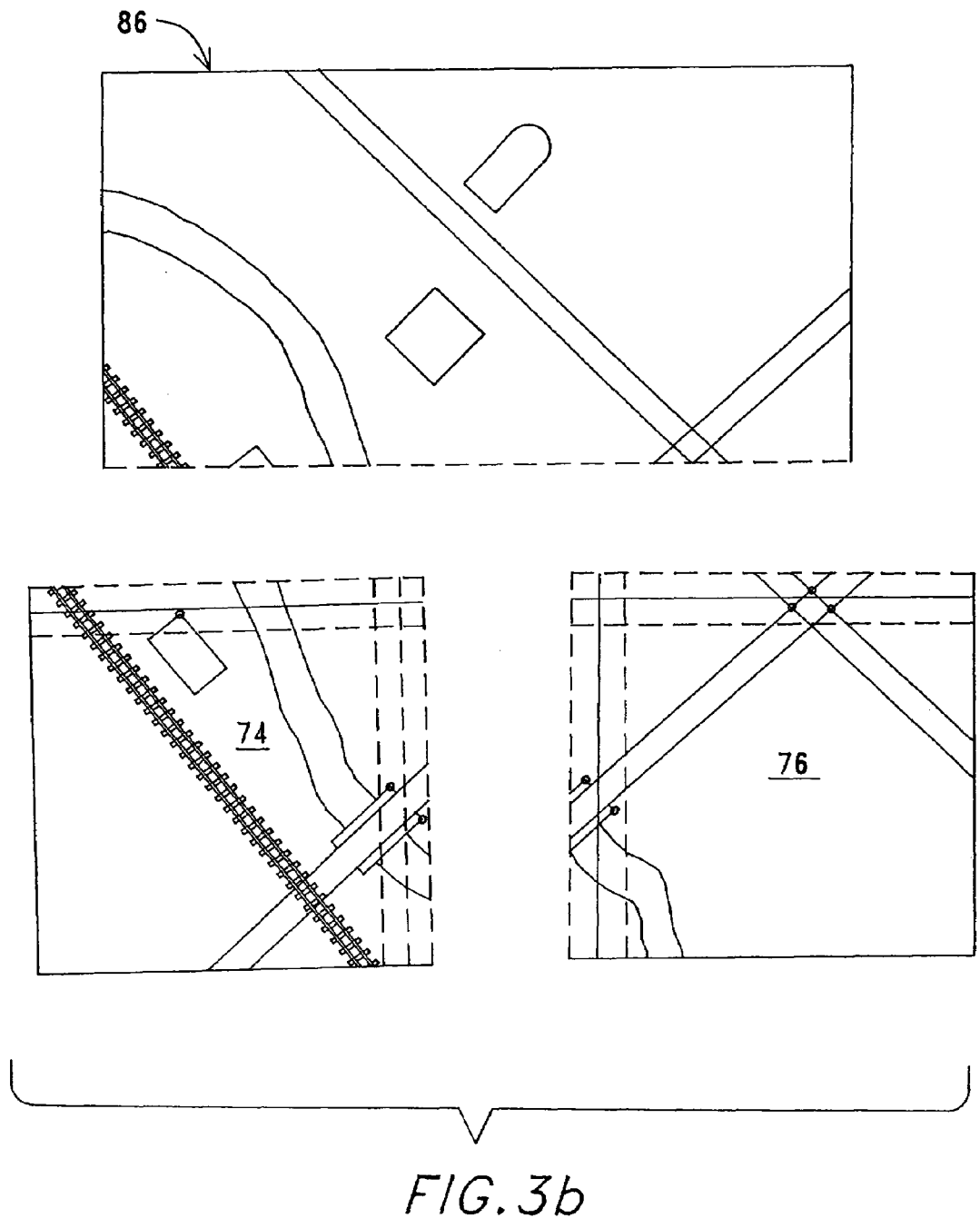

To perfect the synthesis or "stitching" together of the first and second sub-images 70, 72, the software can identify distinct features in the overlapping marginal edge portion 60 of both sub-images 70, 72. Corners, such as $Q_1$, $Q_1'$, and $Q_2$, $Q_2'$, are usually easiest to identify, because sharp light intensity differences, thus electric signal differences, between adjacent photodetectors at such corners cause larger digital value differences for adjacent pixels of the sub-images at such corners. However, other distinct features or variations in pixel values can also be located with software for this synthesizing or stitching process. Once several distinct and matching points, such as $Q_1$, $Q_1'$, and $Q_2$, $Q_2'$, are identified in the respective sub-images 70, 72 their coordinates can be adjusted to register with each other. For example, the master X-Y coordinates of points $Q_1$ and $Q_1'$ are compared to each other and their X-Y differences determined. Likewise, the master X-Y coordinates of points $Q_2$ and $Q_2'$ are compared and their X-Y differences determined. With that difference information, the master X-Y pixels for those points $Q_1'$ and $Q_2'$ of the second sub-image 52 can be adjusted to match the master X-Y coordinates of the corresponding points $Q_1$ and $Q_2$ in the first sub-image 50. Application of ordinary geometry and trigonometry can then be used to shift, including rotating, if necessary, the entire local coordinate system 84 of the second sub-image 72 and thereby adjust the coordinates of all the pixels in the second sub-image 72 to maintain their individual spatial relationships with the adjusted points $Q_1'$ and $Q_2'$. Thus, by identifying several distinct points $Q_1$, $Q_1'$ and $Q_2$, $Q_2'$ in the first and second sub-images 70, 72 and adjusting the coordinates of the points $Q_1$ and $Q_2'$ to register them together with $Q_1$ and $Q_2$, respectively, in the overlapping marginal edge area 60 in FIG. 3b and then adjusting the coordinates of all the rest of the pixels in the second sub-image 72 to maintain their spatial relationships with the points $Q_1$ and $Q_2'$, the two sub-images 70, 72 are stitched together geometrically to form the top half 86 of the large format, macro-image, as shown in FIG. 3b. Of course, if there are no identifiable distinct features in adjacent sub-images, such as if they showed only continuous sea or sky, then the distinct feature-base stitching described above is not needed, and the initial placement by the coordinate systems based on the relative positions and orientations of the lens systems, etc., is sufficient.

The remaining two sub-images 74, 76 in FIG. 3b can be stitched together in a similar manner, as will be described below. However, before doing so, it may be desirable to perform any radiometric adjustments necessary to match gray scales of pixels in the second sub-image 72 with those of the first sub-image 70, so that one part of the half-image 86 in FIG. 3b does not look darker or brighter than the other part. Such gray scale variations in this camera system 10 are usually not a significant problem, because all the digital sub-images 70, 72, 74, 76 are created with the same detector array 20 (FIG. 1). However, it does take some time to read out all of the sub-images 70, 72, 74, 76 sequentially from the detector array 20. Therefore changes in light energy reflected from the object area 30 due to clouds floating over or other lighting changes are possible while the sub-images 70, 72, 74, 76 are being read out. Also, there is some signal output drift, i.e., different electrical signal output for the same incident light energy, in many detector arrays. Therefore, some radiometric adjustment may be necessary, even though all of the sub-images 70, 72, 74, 76 are read out of the same detector array 20 in the camera system 10 described above. Such radiometric adjustments can be made with software by comparing output signal intensity of at least one, but preferably more, pixels of the first sub-image 70 with matching pixels of the second sub-image 72 in the overlapping marginal edge area 60. Whatever adjustments of signal intensity is needed to make the compared pixels in the second sub-image 72 match or nearly match the corresponding pixels in the first sub-image 70 can then be applied also to the other pixels in the second sub-image.

Figure 3C:
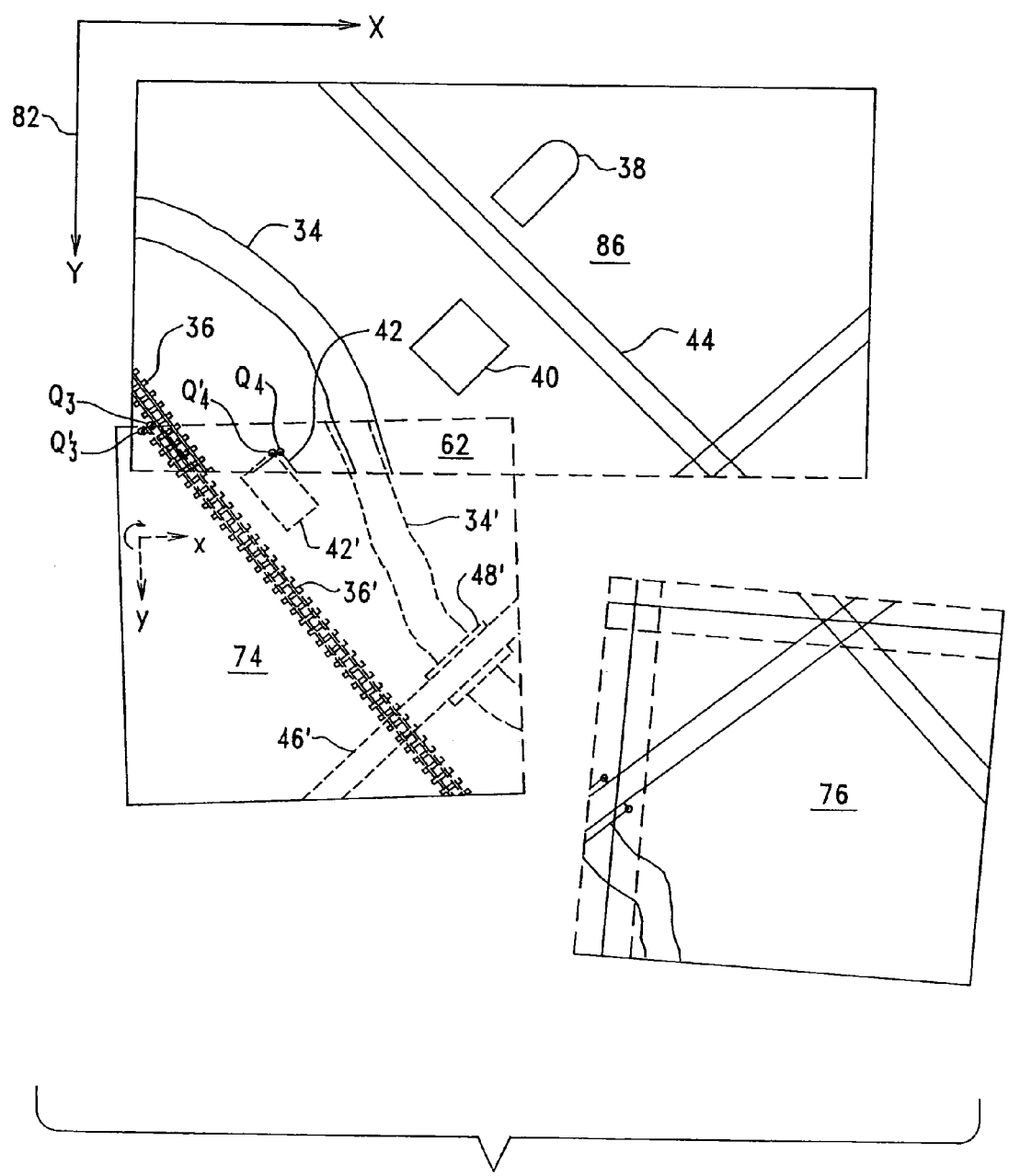
Figure 3D:
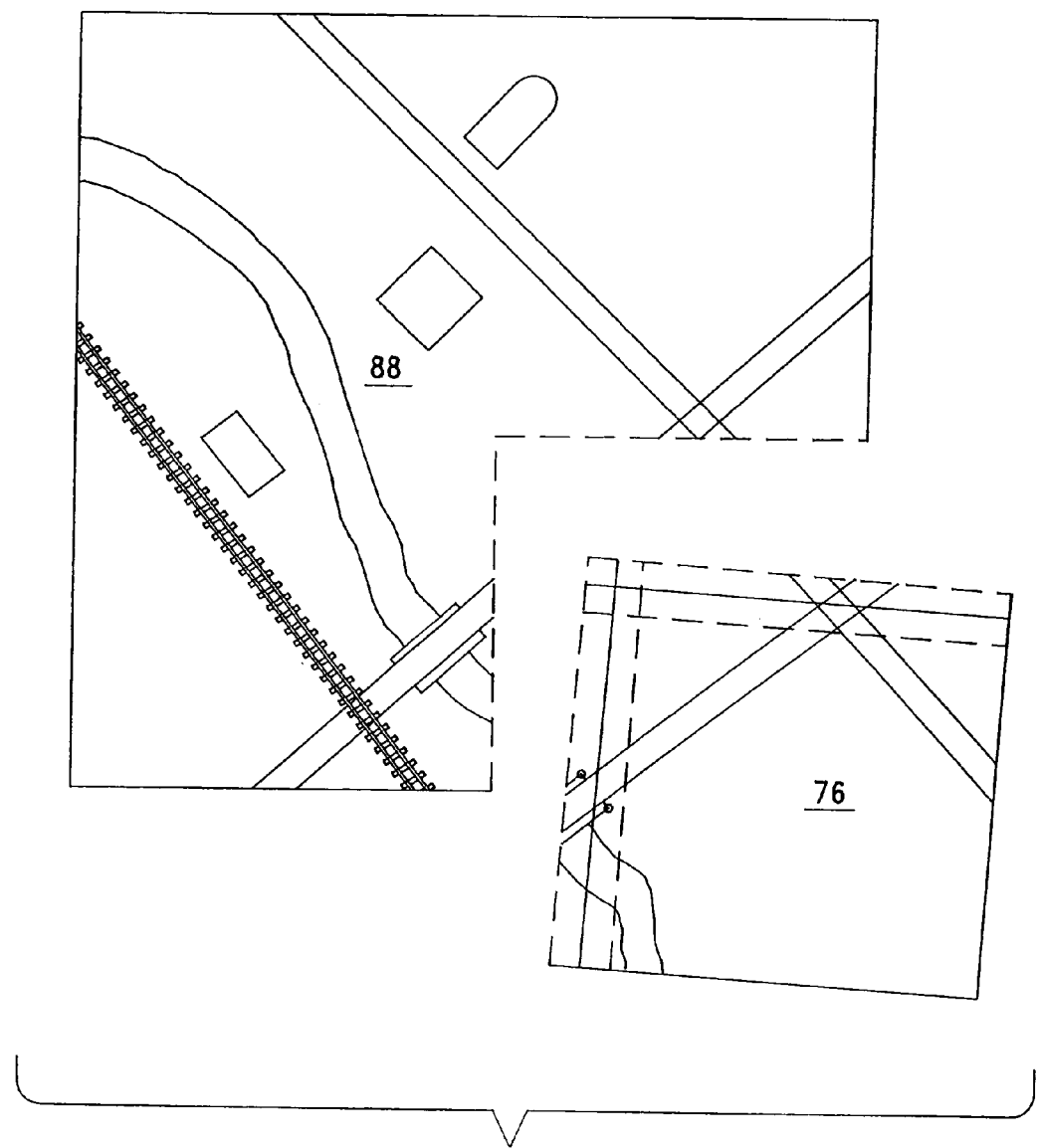

As illustrated in FIG. 3c, the third sub-image 74 is also brought into the master X-Y coordinate system 82 based on mechanical relationships and/or measurements. Then, distinct, corresponding features or points, e.g., $Q_3$, $Q_3'$ and $Q_4$, $Q_4'$, of the upper half-image 86 and the third sub-image 74, respectively, are identified in the overlapping marginal edge area 62 in FIG. 3c. Adjustments are made, as described above, to stitch the third sub-image 74 together with the upper half-image 86 of FIG. 3c to produce the three-fourth-image 88, as shown in FIG. 3d. Radiometric adjustments of the third part 74 to match the upper part 86 of FIG. 3c to coordinate such gray scales for the three-fourth image 88 in FIG. 3d can also be made, as explained above.

Figure 3E:
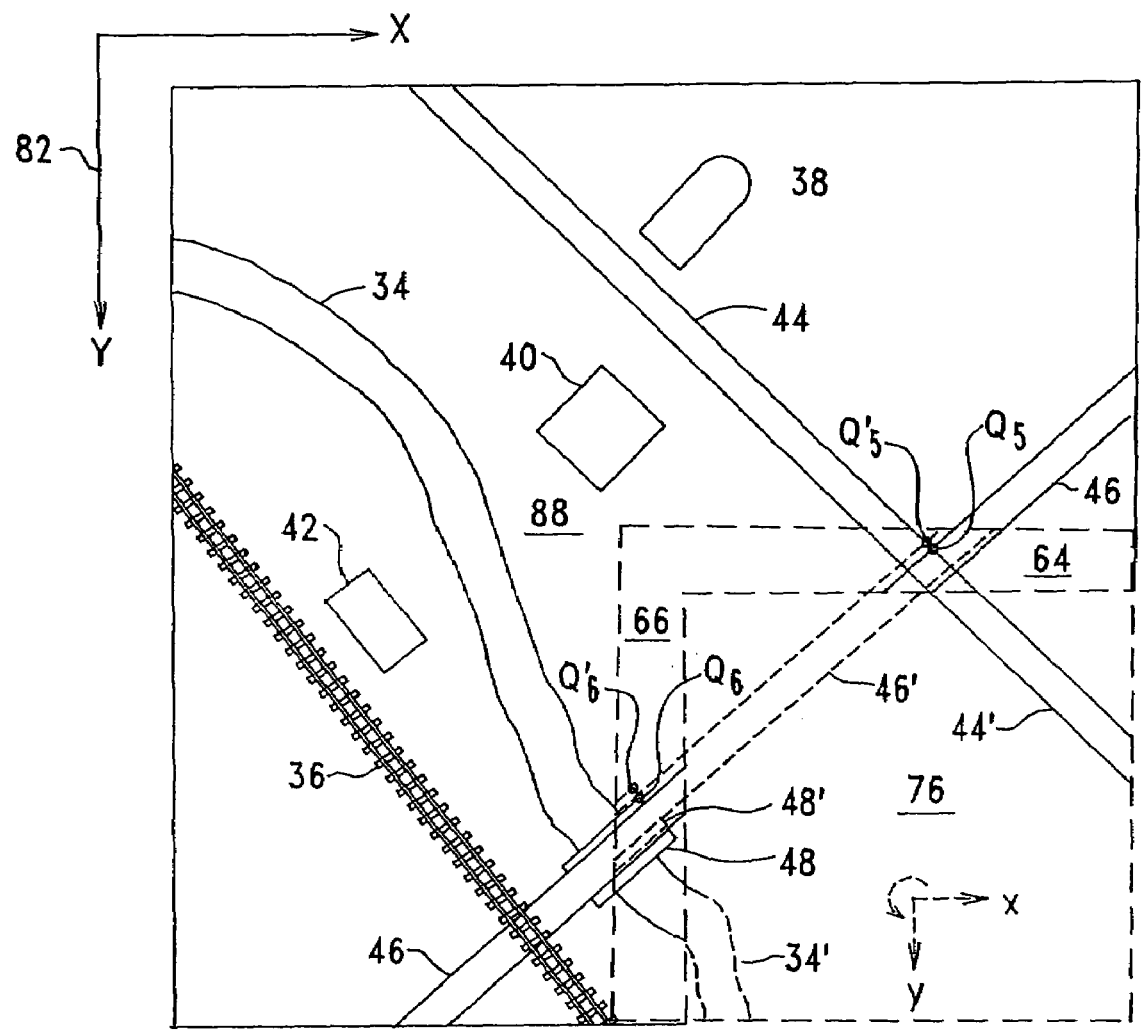

Finally, as illustrated in FIG. 3e, the fourth sub-image 76 from FIG. 3d is also brought into the master X-Y coordinate system 82 based on mechanical relationships and/or measurements. The distinct, corresponding features or points, e.g., $Q_5$, $Q_5'$ and $Q_6$, $Q_6'$, of the three-fourths-image 88 and the fourth sub-image 76, respectively, are identified in either one or both of the overlapping marginal edge areas 64, 66.

Figure 3F:
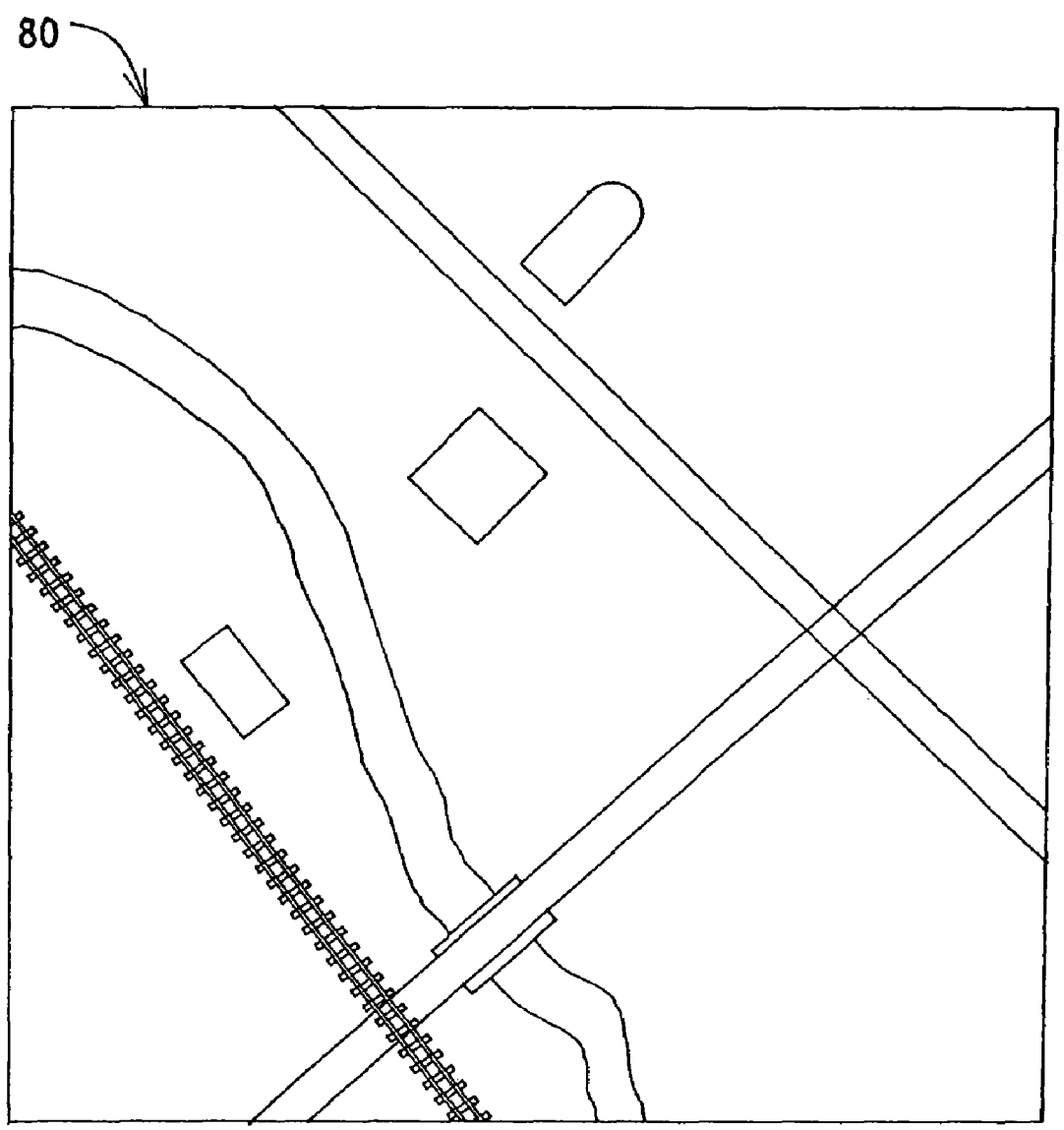

Adjustments are made, as described above, to stitch the fourth sub-image 76 together with the three-fourths-image 88 in FIG. 4e to produce the full, large format, macro-image 80, shown in FIG. 3f. This large format, macro-image 80 is, of course, the large image of the large area object 30 in FIG. 1. Radiometric adjustments can also be made, as explained above. Also, if perfect registration of the points $Q_5$, $Q_5'$ and $Q_6$ $Q_6'$ or other identified points in overlapping marginal edge areas 64, 66 cannot be made due to distortions or other inaccuracies in the processes of the previous stitchings of sub-images 70, 72, 74 or other causes, the software can make blending adjustments to the pixel coordinates to achieve a fit of all the sub-images 70, 72, 74, 76 together into the large, macro-image 80 without concentrating any noticeable distortions.

The large format image 80 of the large area object 30 can be acquired as described above with a readily available, normal-size detector array 20, such as a 1,000×1,000 array or a 2,000×2,000 array, instead of a very expensive, large detector array, yet the geometric resolution is four times better than would be attainable with a conventional digital camera with such a normal-size detector array. Of course, as mentioned above, the digital camera system 10 could be equipped with more lens systems to create even more sub-images and thereby make even a larger format camera for even better geometric resolution.

While reading out, processing, and stitching together four, or even more, sequential sub-images with the large format, digital camera system 10 described above is quicker, more efficient, and takes less computer capacity than comparable-sized digital cameras with large detector arrays, the time required for such sequential read-outs of sub-image data from a single detector array 20 can be a detriment and requires that the object remain still and not move in relation to the camera system 10 during such sub-image data acquisition. While there are many applications for this kind of large format, digital cameras 10, such as for acquiring digital images of paintings, landscapes, or even aerial shots (if the platform is still, such as from a helicopter or hot-air balloon), this drawback is solved by another embodiment of a large format camera system 100 of this invention, shown diagrammatically in FIG. 4, which acquires multiple sub-images simultaneously.

Figure 4:
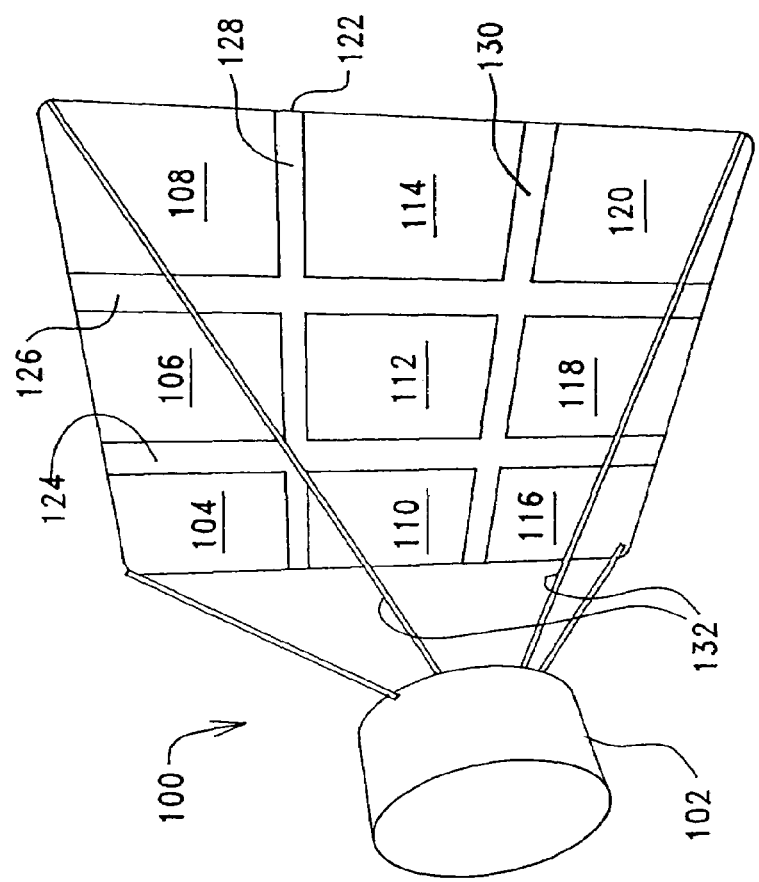
FIG. 4 is a perspective view of a large format, digital camera of this invention with a single lens system and multiple detector arrays in the focal plane.

As shown in FIG. 4, a single lens system 102 is used to focus a large area object (not shown in FIG. 4, but similar to the large area object in FIG. 1) onto a plurality of detector arrays, for example, the nine detector arrays 104, 106, 108, 110, 112, 114, 116, 118, 120, all positioned in the focal plane 122 of the lens system 102. Each of the detector arrays can be a normal size, such as 1,000×1,000 or 2,000×2,000, but such nine normal-size detector arrays 104, 106, 108, 110, 112, 114, 116, 118, 120 provides nine times more pixels than one of such arrays, thus nine times better resolution. Such better resolution facilitates focusing larger object areas onto the plurality of detector arrays to produce large format images of large area objects, while maintaining or even enhancing the geometric resolution. Each of the plurality of detector arrays 104, 106, 108, 110, 112, 114, 116, 118, 120 produces a sub-image of a part or sub-area of the large area object, and such sub-images can be combined together in a mosaic by software to produce the large format image of the large area object.

While such large format camera system 100 has the advantage of exposing a plurality of detector arrays 104, 106, 108, 110, 112, 114, 116, 118, 120 simultaneously to sub-areas of the large area object and the advantage of reading out sub-images from the plurality detector arrays simultaneously, for example, with parallel data processors (not shown), this approach leaves small image gaps between adjacent sub-images because of physical gaps 124, 126, 128, 130 between the detector arrays mounted adjacent each other in the focal plane 122. Such gaps cannot be avoided, because the sensitive area of each detector array 104, 106, 108, 110, 112, 114, 116, 118, 120 is always smaller than the physical size of the array unit.

Figure 5:
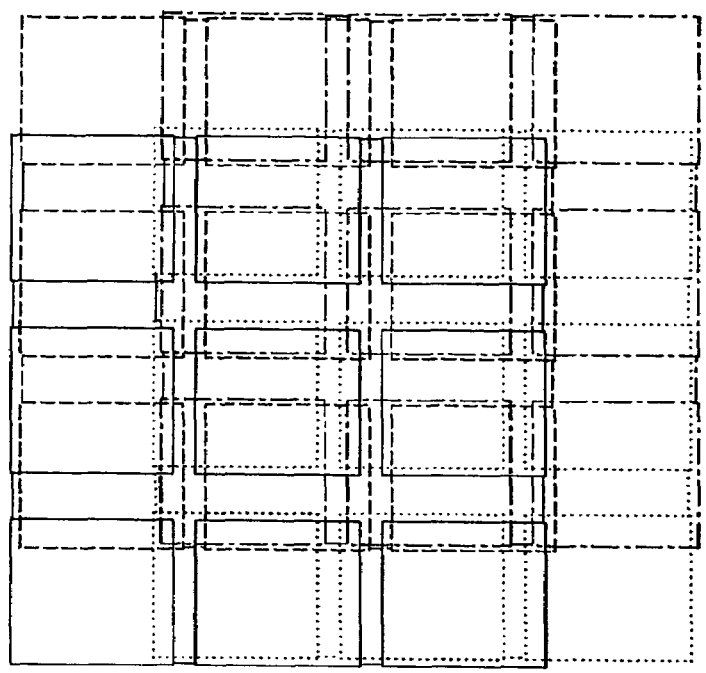
FIG. 5 is a view of overlapping sub-images produced by shifting the optical path of the camera system of FIG. 4.

There are several approaches to filling the gaps between the sub-images produced by the plurality of detector arrays 104, 106, 108, 110, 112, 114, 116, 118, 120. One approach is to fill the gaps between the sub-images by combining more cameras 100 together into one system to produce overlapping sub-images. Another approach is to rotate a prism (not shown) in the optical path 132 to shift the projection of the light onto the set of detector arrays 104, 106, 108, 110, 112, 114, 116, 118, 120 in such a way that multiple exposures (e.g., four) cover the entire large area format with a high degree of redundancy, as illustrated in FIG. 5. A rotation of the prism (not shown) at 90, 135, and 180 degrees would cause shifts to the left, down, and left+down, respectively. Each detector array 104, 106, 108, 110, 112, 114, 116, 118, 120 has its sub-image read out before the prism shift and after each prism shift. The read-out time is typically less than one (1) second, such as, for example, about one-half second. When all of the sub-images are then overlayed, they appear as shown in FIG. 5. For both approaches of filling the gaps between the initial set of sub-images, as described above, software is used to stitch together the overlapping sub-images by identifying distinctive features or points in overlapping sub-image areas and then adjusting pixel coordinates to register the distinctive features or points in a manner similar to that described above for camera system 10.

Figure 6:
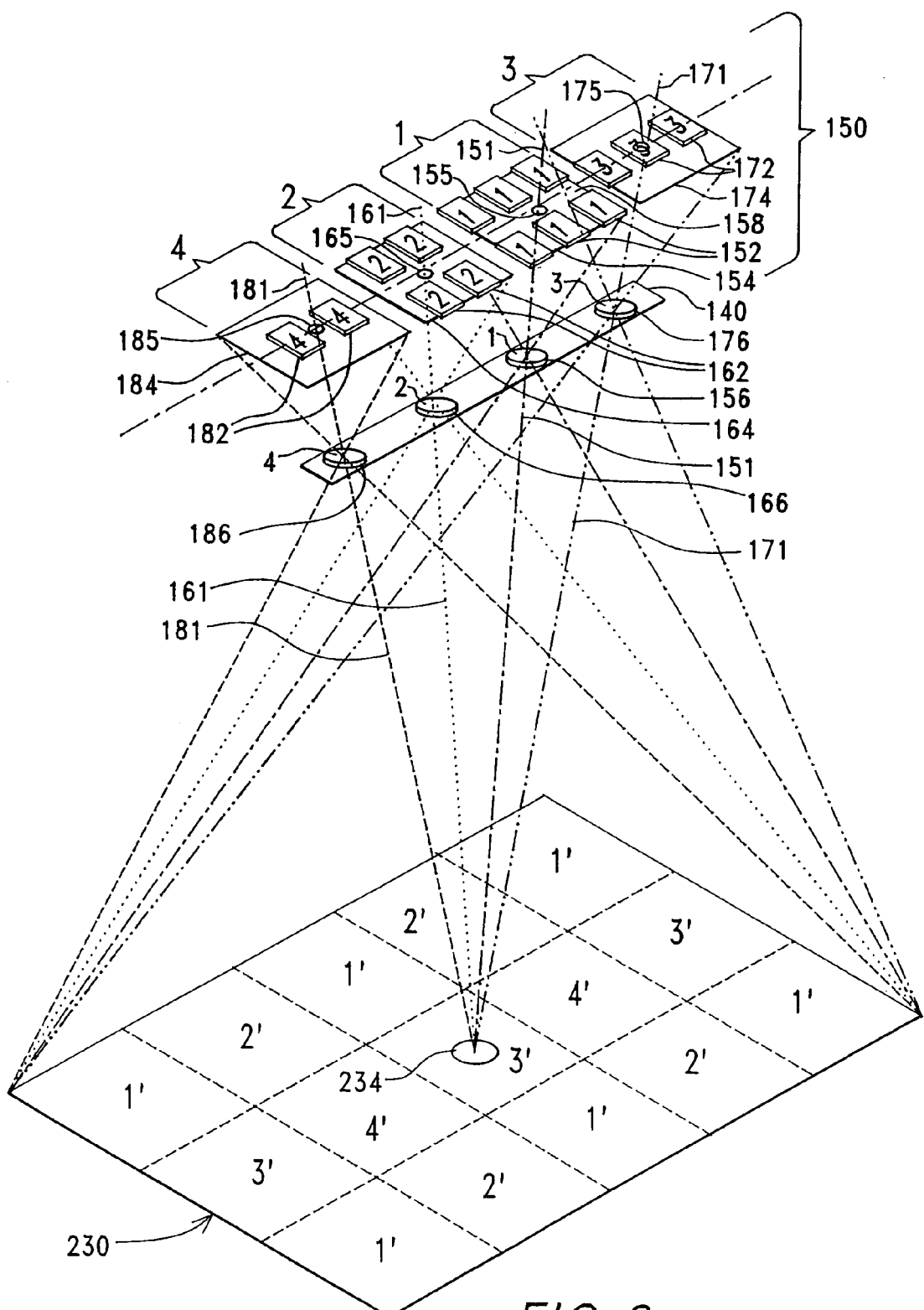
FIG. 6 is an isometric view of an embodiment of the large format digital camera system of this invention comprising a plurality of sub-camera systems, each having one or more detector arrays exposed by a lens system.
Figure 7:
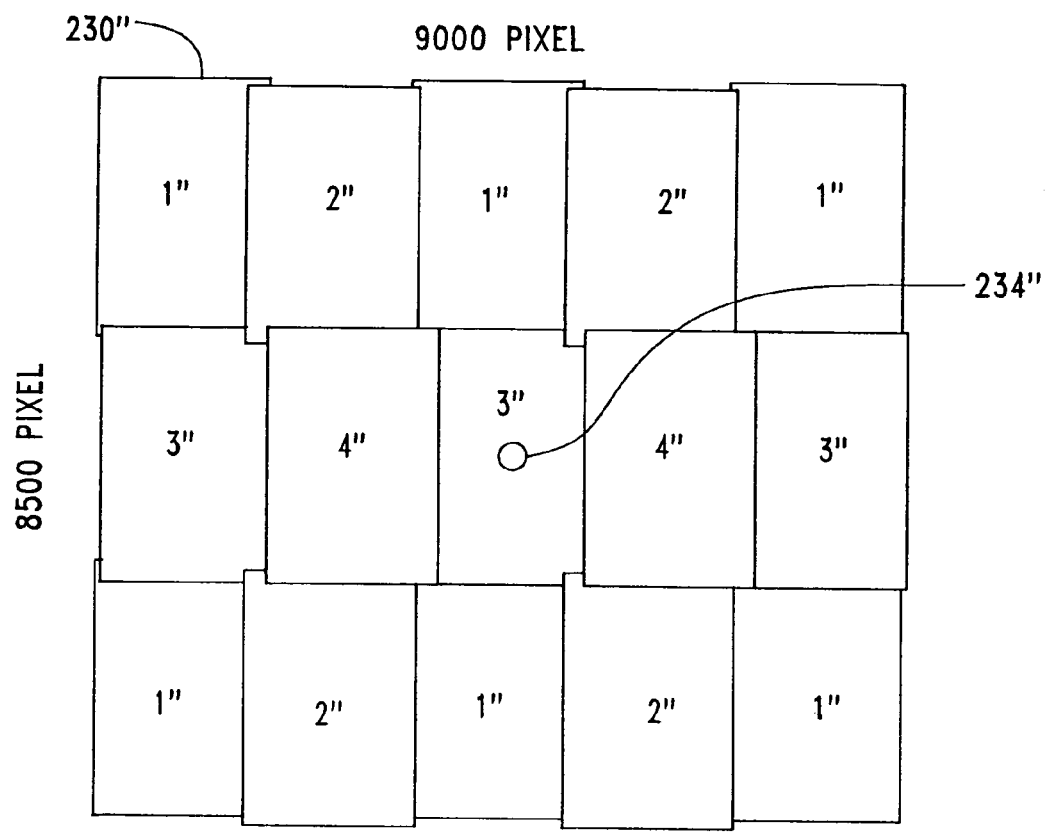
FIG. 7 is a view of overlapping digital sub-images produced by the digital camera system of FIG. 6 to form a composite, large format macro-image.

The former approach to filling the gaps between adjacent detector arrays in a camera system comprising multiple detector arrays exposed to the large area object through a single lens system, as described above, can be enhanced to an improved large format camera system 150, as illustrated in FIG. 6, wherein the detector arrays exposed through a single lens are spread farther apart than in the camera system 100 of FIG. 4, and the fill is provided by a plurality of additional cameras. As shown in FIG. 6, this large format camera system 150 comprises a plurality, e.g., four, connected sub-camera systems designated as 1, 2, 3, and 4. Each sub-camera system 1, 2, 3, 4 in the macro-camera system 150 is, itself, a large format camera system similar to the large format camera system 100 in FIG. 4, i.e., each has a plurality of detector arrays exposed to the large area object 230. With continuing reference to FIG. 6, the first sub-camera system 1 comprises a plurality (e.g., six) of detector arrays 152 positioned spaced apart from each other in the focal pane 154 of the lens system 156. The spaces 158 between the detector arrays 152 are preferably almost, but not quite, as long or as wide as a detector arrays 152, so that sub-images from other ones of the sub-camera systems 2, 3, and 4 with similar sized and shaped detector arrays can fill the gaps between sub-images acquired by detector arrays 152 with some overlap in the marginal edge portions for stitching together to make a large area macro-image in a manner similar to that described above for camera system 10 and as will be explained in more detail below for this camera system 150. When all six of the detector arrays 152 of sub-camera 1 are exposed to the large area object 230 by lens system 156, each of the six detector arrays will create a sub-image of a part or sub-area 1' of the large area object 230 with some overlap at marginal edge portions into adjacent sub-areas, as explained above. Those sub-images acquired by the sub-camera system 1 are designated 1" in the macro-image 232 in FIG. 7. The large format, macro-image 230" in FIG. 7 is a macro-image of the large area object 230 in FIG. 6 pieced or stitched together from the sub-images 1", 2", 3", 4" acquired by all the sub-camera systems 1, 2, 3, 4, respectively. Note that while the center 234' of the large area object 230 is the perspective center 155 of the sub-camera system 1, i.e., on the optic axis 151 of the sub-camera system 1, it is not included in any of the sub-images 1" in FIG. 7 acquired by the sub-camera system 1 of FIG. 6, because the optic axis 151 extends through the focal plane 154 in a space 158 between the detector arrays 152 of sub-camera system 1.

As shown in FIG. 6, the other sub-camera systems 2, 3, 4 have their respective lens systems 166, 176, 186, all with the same focal length as lens system 156 of sub-camera system 1. The lens systems are mounted adjacent each other, preferably in a common plane, so that the optic axis 151, 161, 171, 181 of each lens system 156, 166, 176, 186, respectively, substantially parallel to the optic axes of the other lens systems. Note that physical limitations in FIG. 6 of depicting the four sub-camera systems 151, 161, 171, 181 acquiring sub-images of a large area object 230, which is very much larger than the camera system 150 (a few millimeters or centimeters between lens systems and object size in meters or even kilometers), make it impossible to draw the lines depicting optic axes 151, 161, 171, 181 in FIG. 6 as parallel and still depict other details of the system, but persons skilled in the art can understand and make this mental adjustment in relation to FIG. 6. Also, each sub-camera system 2, 3, 4 has one or more detector arrays 162, 172, 182, respectively mounted in the respective focal plane 164, 174, 184 of lens systems 166, 176, 186. In the preferred embodiment shown in FIG. 6, sub-camera system 2 has four detector arrays 162, sub-camera system 3 has three detector arrays 172, and sub-camera system 4 has two detector arrays 182, all positioned so that sub-images acquired by them fill gaps between sub-images acquired by sub-camera system 1 and by other sub-camera systems with some overlap in marginal edge portions to accommodate stitching sub-images together, as described above. One of the advantages of the large format, digital camera systems of this invention, including, but not limited to the camera system 150 in FIG. 6, is that larger format macro-images can be acquired, if desired, by either adding more detector arrays, or by using larger detector arrays, or both, without having to add more lens systems.

Again, the optic axes 151, 161, 171, 181 of all the sub-camera systems 1, 2, 3, 4 are substantially parallel to each other, as explained above. When the camera system 150 is mounted on a moving platform, such as an airplane or spacecraft, the shutters of the respective lens systems 156, 166, 176, 186 can be actuated in a timed sequence coordinated with the speed of travel, as will be explained in more detail below. Therefore, the optic axis of each lens system 156, 166, 176, 186, which intersects the optic center 155, 165, 175, 185 of its respective image plane 154, 164, 174, 184, will also extend through the same center 234 of the large area object 230, so that the perspective centers 155, 165, 175, 185 of each sub-camera system 1, 2, 3, 4 is the same in order to have the corresponding image center 230" in FIG. 7 the same for all the sub-images acquired by all the sub-camera systems 1, 2, 3, 4. In other words, with such timed sequential shutter actuation, the optic axis 151, 161, 171, 181 of each sub-camera system 1, 2, 3, 4 extends through the object center 234 as its respective shutter is actuated. Consequently, when the sub-images 1", 2", 3", 4" are acquired in this manner, they will all have the same perspective center 234" corresponding to the object center 234 and to the respective optic centers 155, 165, 175, 185 of the sub-cameras 1, 2, 3, 4. Of course, if all of the shutters are operated simultaneously, which is an option for some applications, sub-images from different sub-cameras 1, 2, 3, 4 will have different perspective centers, but such differences would be virtually imperceptible after the sub-images 1", 2", 3", 4" are stitched together. The lens systems 156, 166, 176, 186 can be mounted in a common plane 140, and the focal planes 154, 164, 174, 184 can be co-planar. Of course, the lens systems 156, 166, 176, 186 and their focal planes 154, 164, 174, 184 do not have to be positioned in a straight line as shown in FIG. 6, but could instead be positioned at corners of a rectangle, square, or any other pattern, but preferably coplanar and close together to minimize the distance between parallel optic axes 151, 161, 171, 181.

The sub-images 1" of sub-areas 1' acquired by sub-camera system 1 are stitched together, as described above, in a mosaic with sub-images 2", 3", 4" of respective sub-areas 2', 3', 4' acquired by sub-camera systems 2, 3, 4, respectively, as shown in FIG. 7 to complete the large format, macro-image 230" of large area image 230 of FIG. 6. Again, as explained above for other embodiments, an advantage of this kind of large format, digital camera system 150 is that it can create a large format image 230" with a plurality of common, conventional size, detector arrays and with one common optical center 234". Further, this large format camera system 150 can accommodate acquisition of all the sub-images with all the detector arrays 152, 162, 172, 182 simultaneously. Stitching them together to get the macro-image 230" can be done later. Therefore, with sequential shutter actuation so that there is one perspective center 234 common to all the sub-cameras 1, 2, 3, 4 and to all the sub-images, the resulting macro-image 230" of the large format camera system 150 has one perspective center, much like a picture or image acquired with an ordinary film-based camera or an ordinary small format digital camera with a single lens system.

Alternatively, if the camera system 150 is stationary, the object 230 can be either stationary or moving in relation to the camera system 150, and the resulting large format image 230" will not be distorted any more than would be a picture or image acquired by an ordinary film-based camera or a small format digital camera. For example, the large format, digital camera 150 could be used in a stationary position to make a large format, digital image of a painting or of a landscape scene, or even scenes in which an object is moving, where the large format is desired for better resolution of details than can be acquired with ordinary size format digital cameras.

Figure 8:
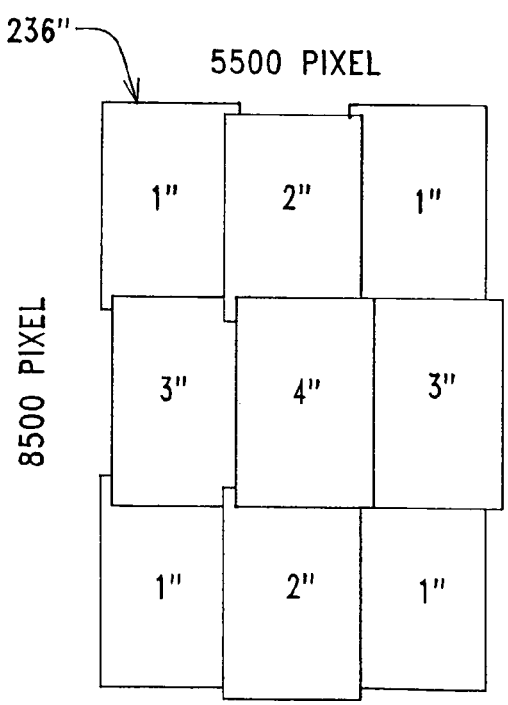
FIG. 8 is a view similar to FIG. 7, but with a different example number and pattern of sub-images.
Figure 9:
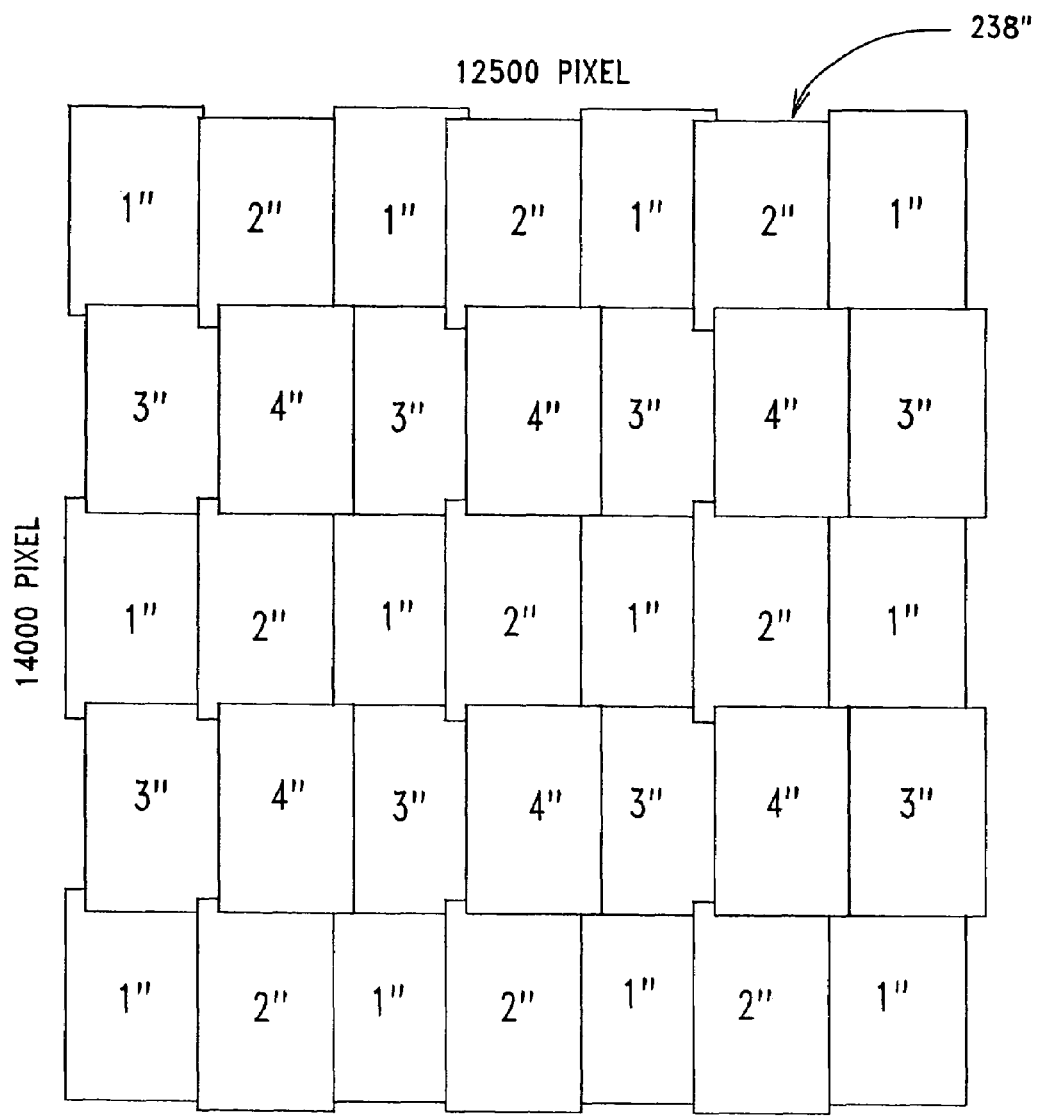
FIG. 9 is a view similar to FIG. 7, but with yet another different example number and pattern of sub-images.

In the example large format digital camera 150 of FIGS. 6 and 7, an example size for each detector array 152, 162, 172, 182 may be 2,000×3,000 detectors. Allowing for several hundred pixel rows and columns of overlap in marginal edge areas for stitching sub-images together, as described above, will produce a large format image 230" of about 9,000×8,500 pixels. Different numbers and arrangements or patterns of detector arrays in sub-camera systems can be used to produce different sized macro-images. For example, four detector arrays in a first sub-camera system, two detector arrays in a second sub-camera system, two detector arrays in a third sub-camera system, and one detector array in a fourth sub-camera system can produce a mosaic and resulting smaller macro-image 236" illustrated in FIG. 8. Going larger, the macro-image 238" in FIG. 9 can be produced by a first sub-camera system with twelve detector arrays, a second sub-camera system with nine detector arrays, a third sub-camera system with eight detector arrays, and a fourth sub-camera system with six detector arrays. Again, these example macro-images 236" and 238" of FIGS. 8 and 9 are produced with a common optical center for all sub-cameras in the system.

For control of sub-image acquisitions, each of the sub-camera systems 1, 2, 3, 4 of the large format, digital camera system 150 in FIG. 6 preferably has an electronically controlled shutter (not shown) but is well-known to persons skilled in the art in its lens system 156, 166, 176, 186, which can be actuated simultaneously. Such electronic shutter actuation signals can also be used to synchronize detector array exposure time with the shutter actuations, which is important, especially if the camera system 150 is mounted on a moving vehicle, such as an aircraft or spacecraft. Also, it is preferred that each of the detector arrays 152, 162, 172, 182 is connected to a separate electronic data processing module, such as sensor electronics, analog electronics, digital electronics, and computer interface to produce individual data streams from the respective detector arrays 152, 162, 172, 182 to the data storage media. This preferred arrangement facilitates parallel capture of sub-image data from the individual detector arrays or of small groups of the detector arrays, which is quicker than serial or sequential read-out of data from the detector arrays (also much quicker than read-out of data from a large detector array). Such quicker read-out capability also enables shorter time intervals from one simultaneous exposure of the detector arrays to the next. This capability is important for any application where multiple macro-images have to be acquired quickly one after the other, such as when a path of macro-images of the earth's surface are being acquired with the camera system 150 from an airplane. Only medium accuracy is needed for the shutter synchronization for simultaneous exposure of the detector arrays 152, 162, 172, 182, because the sub-image 1", 2", 3", 4" stitching process compensates for small errors in the synchronization.

The method and apparatus of this invention can also facilitate quick acquisition of large format, color digital images. It is conventional for photodetectors, such as charge-coupled devices (CCD's), to be arranged to produce color digital images directly. However, that approach is typically at the expense of geometric resolution. Therefore, there is a trade-off between: (i) creating color directly with a smaller area photodetector array; or (ii) using black and white photodetectors along with multiple cones (lens to focal plane optical path) and color (wavelength) filters. The following options are supported by the method and apparatus of this invention:

(1) Use of color photodetector (e.g., CCD) arrays directly on the focal plane of the optical systems 10, 100 or sub-cameras 1, 2, 3, 4 and obtain color images;

(2) Using black and white photodetectors (e.g., CCD's) and employing multiple cones with color filters, having one produce green sub-images, a second cone produce blue sub-images, and a third cone produce red sub-images, and then combining the green red, and blue sub-images by stitching into a single color image; or (3) Using one black and white set of sub-images in the optical arrangement, but exploiting in-flight redundancy (when the large format camera system is mounted a moving vehicle, such as an airplane or spacecraft) to produce color-using filter wheels in front of the cones, wherein one image is taken in green, the next in red, and the third in blue, one after the other, as the platform moves and then obtaining the single color image by stitching the green, red, and blue images together.

Figure 10:
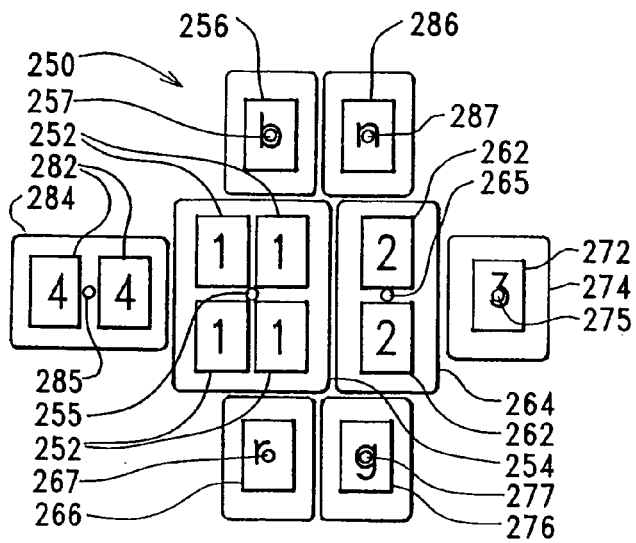
FIG. 10 is a diagrammatic view of the detector arrays of a large format, color, digital camera system of this invention.

Color information acquisition with a large format digital camera system 250 illustrated in FIG. 10 is similar to the large format camera system 150 in FIGS. 6-9, but is equipped with additional sub-camera systems, including lens and detector arrays, for color and near infrared (nir). As shown in FIG. 10, there are eight sub-camera systems 1, 2, 3, 4, r, g, b, nir. Near infrared red detectors can be used instead of, or in addition to, color detectors in the color options and systems described above and below, although sometimes only color is mentioned to keep the explanations and descriptions from becoming unnecessarily cumbersome. Also, only the light sensor surfaces of the detector arrays of the sub-camera systems are shown in FIG. 10, which is sufficient for purposes of this description, since the lens systems and other elements of the sub-camera systems can readily be understood by reference back to other embodiments described above.

Figure 11:
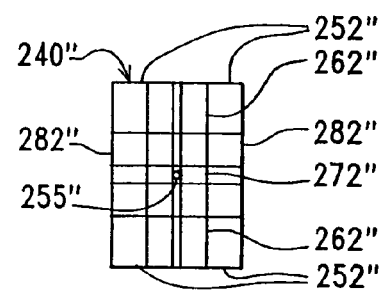
FIG. 11 is a diagrammatic view of the monochromatic or panchromatic, large format, macro-image formed by combining sub-images acquired from sub-camera systems of the large format, color digital camera system of FIG. 10.
Figure 12A:
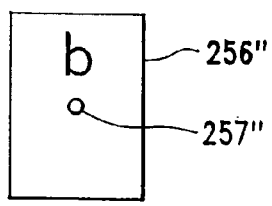
FIGS. 12a-c are blue, red, and green sub-images acquired from blue, red, and green detector arrays of the camera system of FIG. 10.
Figure 12B:
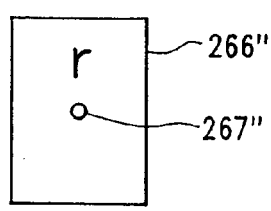
Figure 12C:
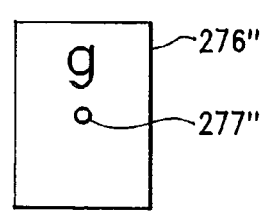
Figure 13:
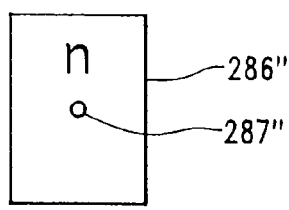
FIG. 13 is a near infrared sub-image acquired from the near infrared detector array of the camera system of FIG. 10.

The sub-camera systems 1, 2, 3, 4 of the large format, color, digital camera system have their respective detector arrays 252, 262, 272, 282 positioned in co-planar focal planes 254, 264, 274, 284, and the respective lens systems (not shown in FIG. 10) have the same focal lengths, as described above for camera system 150 in FIG. 6. The optical or perspective centers 255, 265, 275, 285 for all of the sub-camera systems 1, 2, 3, 4 in FIG. 10 are the same, i.e., are on the optic axes of the respective lens systems (not shown in FIG. 10) of the respective sub-camera systems 1, 2, 3, 4 and correspond to the same center of the large area object being images (not shown in FIG. 10), as also described above for camera system 150 in FIG. 6. Therefore, the sub-images 262", 272", 282" of sub-areas of the large area object being imaged (not shown in FIG. 10) produced by the detector arrays 262, 272, 282, when combined together with the sub-images 252" of sub-areas of the large area image, fill the gaps between the sub-images 252" to produce the large format, macro-image 240", as shown in FIG. 11. The overlapping sub-images 252", 262", 272", 282" are stitched together, as described above, to produce the large format, macro-image of the large area object with a high geometric resolution.

The blue (b), red (r), green (g), and near infrared (n) detector arrays 256, 266, 276, 286, respectively, in the large format, color camera system 250, are also exposed to the large area object. Their resulting sub-images 256", 266", 276", 286" shown in FIGS. 12*a-c* and 13, respectively, are then also combined with the large format, macro-image 240" to produce colored and/or near infrared large format macro-images. The color sub-images can be produced at the same resolution as the black and white (non-color) sub-images 252", 262", 272", 282", if desired. However, such high resolution is usually not necessary for color purposes. Therefore, the example color sub-images 256", 266", 276", 286" of the large format, color, digital camera system 250 illustrated in FIG. 10 are produced with a lower resolution than the black and white sub-images 265", 262", 272", 282". To do so, each color detector array 256, 266, 276, 286, which is about the same size (e.g., 2,000×3,000) as the black and white detector arrays 252, 262, 272, 282, is exposed not just to a sub-area, but to the entire large area object (not shown in FIG. 10). Therefore, color sub-images 256", 266", 276", 286" are at a lower geometric resolution than the black and white sub-images 252", 262", 272", 282". Of course the blue, red, green, and near infrared sub-cameras that produce the color sub-images 256", 266", 276", 286" have to be configured differently than the black and white sub-cameras to produce such lower geometric resolution, color, sub-images 256", 266", 276", 286" on the same size detector arrays. For example, the focal lengths of the lens systems for the color sub-cameras could be shorter than the focal lengths of the black and white sub-cameras in order to expose the color detector arrays 256, 266, 276, 286 to the entire large area object. However, the optical and perspective centers 257, 267, 277, 287 of the color sub-cameras and resulting perspective sub-image centers 257", 267", 277", 287" are the same as each other and the same as those of the black and white (i.e., monochromatic or panchromatic) sub-cameras.

With the color sub-images 256", 266", 276", 286" each being of the entire large area object, each of such color sub-images can be superimposed onto composite, large format, black and white image 240" of FIG. 11 by stitching, as described above. With all three of the primary color blue, red, and green sub-images 256", 266", 276" superimposed onto, and stitched together with, the black and white macro-image 240", the macro-image 240" can be colored. Essentially, once the colored sub-images 256", 266", 276" are registered on the black and white macro-image 240", the black and white pixels are assigned the color values of the dominant (strongest or most intense) color pixels in corresponding geometric locations or by the logical context in the high resolution monochromatic or panchromatic image analysis, as explained below. For a large format, macro-image in near infrared (nir), the nir pixel values are assigned to the black and white pixels at corresponding geometric locations.

The above-described merging of the high-resolution monochromatic, panchromatic or black and white macro-image 240" with the lower resolution color and/or near infrared sub-images 256", 266", 276", 286" is preferably, but not necessarily, based on exploiting the high resolution image content of the panchromatic or black and white macro-image for an image segmentation based on edge detection in order to avoid lower resolution color mismatch blurring or bleeding across sharp edges or borders of features in the macro-image 240". In other words, software used to detect distinct features for the stitching process of the panchromatic or black and white macro-image 240" can also detect edges of features. For example, referring back momentarily to FIGS. 1-3, in addition to identifying a few points on distinct features by contrasts or magnitude of intensity value differences between adjacent pixels for stitching purposes, $Q_1$, $Q_1'$, $Q_2$, $Q_2'$, $Q_3$, $Q_3'$, $Q_4$, $Q_4'$, $Q_5$, $Q_5'$, $Q_6$, $Q_6'$, etc., on distant purposes, as described above, the software can also identify edges of features in the sub-images 70, 72, 74, 76 and in the macro-image 80, such as the edges of the stream 34, railroad 36, buildings 38, 40, 42, streets 44, 46, bridge 48, and the like. Therefore, for purposes of assigning dominant color and/or nir values from lower resolution color sub-images, 256", 266", 276", such as those described above, to a macro-image 80, the break between, for example, dominant color pixels of water in the stream 34 segment of macro-image 80 color pixels of the adjacent land segment of macro-image 80 would be based on the pixels in the high resolution image 80 that identify the edges of the stream 34 rather than on the lower resolution pixels of color and/or nir sub-images. In other words, if the dominant color is blue for several low resolution pixel distances on one side of the stream 34 edge marked by high resolution pixels, while the dominant color is green for several low resolution pixel distances on the other side of the stream 34 edge marked by the high resolution pixels, then the break between the blue color (stream 34) segment and the green color (adjacent land) segment will be made by assigning blue values to the high resolution pixels on the one side of the stream 34 edge and assigning green values to the high resolution pixels on the other side of the stream 34 edge.

Figure 14:
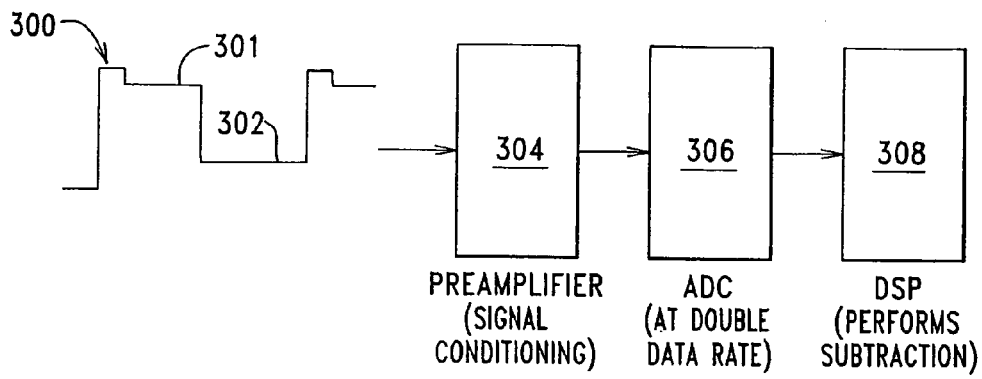
FIG. 14 is a function block diagram of the digital processing of photodetector signals of the large format, digital cameras of this invention.

High quality reading and evaluation of photodetector signals, such as signals from charge-coupled devices (CCD's), often requires at least some preprocessing of the information at the output of the photodetector. To reduce "reset noise", which is a typical characteristic of CCD's, the voltage of the output signal from the CCD is evaluated twice per picture element (pixel). This process is known as "Correlated Double Sampling" (CDS). Known implementations of the CDS take place in the analog domain. A preferred, but not essential, feature of this invention is to convert the CCD output signals twice per pixel using an analog to digital (A/D) converter at the double sampling rate and to perform the subtraction of the two sampled output signals in the digital domain, instead of the analog domain. Such digital subtraction can take place in a digital signal processor, which may also be used for other purposes, such as data compression, or in a programmable logic device used to provide signals necessary to control the CCD. As shown in FIG. 14, the voltage of the output signal 300 of the CCD is sampled first at 301, after deleting the charge of the previous exposure, i.e., of the previous pixel information to obtain its reset level. Then, the actual pixel information is shifted to the output gate and, the output signal 300 is sampled again at 302. The difference between the reset voltage 301 and the exposed pixel voltage 302 is the voltage value that is indicative of the actual intensity of the light energy incident on the actual pixel position of the CCD during the exposure.

However, rather than making an analog subtraction of these two voltage levels 301, 302, the subtraction is preferably done digitally. Therefore, as shown in FIG. 14, the analog output signal 300 of the CCD is preamplified and conditioned in a preamplifier circuit 304 and converted to digital format in the analog to digital converter 306. Such preamplifier 304 and analog to digital converter 306 circuits and devices are well-known in the art. The digital signal processor or programmable logic device 308 then performs the subtraction digitally to read out a digital value of the light intensity that is incident on the CCD. To maintain a speed comparable to a conventional analog subtraction of the signals 301, 302, an analog to digital converter 306 has to be used at twice the sampling rate. This process has the advantages of simpler and more reliable hardware circuitry and better accuracy, because systemic errors of the one and only data path are subtracted for the final result, which pushes the concept of Correlated Double Sampling (CDS) to its theoretical limits.

Figure 15:
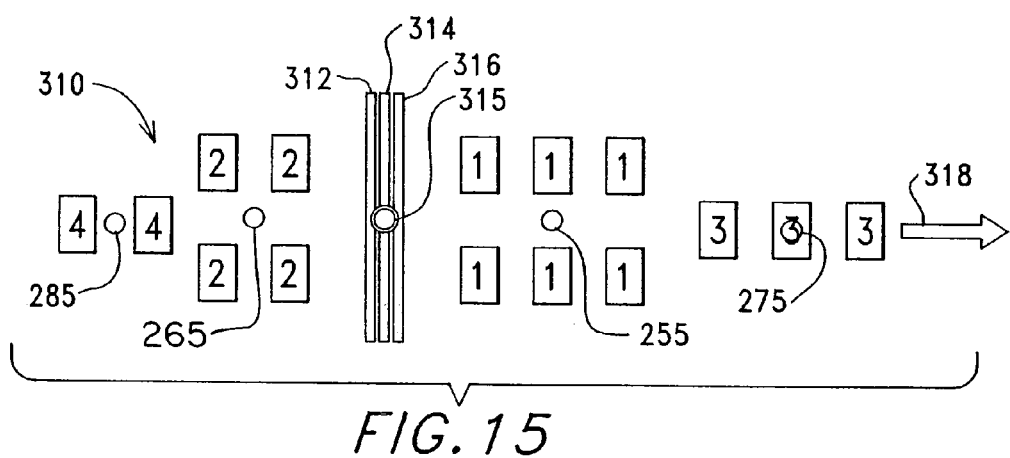
FIG. 15 is a diagrammatic view of another embodiment large format, color, digital camera system of this invention.

An alternative to the large format, color, digital camera system 250 of FIG. 10 is the large format, color, digital camera system 310 shown in FIG. 15, especially for kinematic (moving) digital imaging systems, e.g., aerial imaging systems in airplanes and the like. The monochromatic, high resolution sub-camera systems 1, 2, 3, 4 of this camera system 350 are shown, for example, arranged much like those in the camera system embodiment 150 of FIGS. 6 and 7, thus the same component designation numbers are used in FIG. 15 for those components and no further explanation of the acquisition of the monochromatic or panchromatic sub-images 1", 2", 3", 4" and stitching to produce the monochromatic or panchromatic macro-images 230" is needed. To add color to the large format, macro-image 230", another sub-camera system 5 with a set of color linear detector arrays, e.g., blue 312, red 314, green 316, is positioned adjacent, or intermingled with, the monochromatic sub-camera systems 1, 2, 3, 4, as shown in FIG. 15. The lens system for the color sub-camera system 5 is not shown in FIG. 15, because persons skilled in the art know how to focus the large area object 230 (FIG. 6) onto the linear color arrays 312, 314, 316 (FIG. 15). Suffice it to say that the full width of the large area object that comprises the macro-image 230" (FIG. 7) should be detected by the color linear arrays 312, 314, 316, as the camera system 310 moves as indicated by arrow 318 (FIG. 15) over the large area object 230 (FIG. 6). Again, as explained above in relation to the large format, color camera system 250 of FIG. 10, the color sub-images acquired by the linear color detector arrays 312, 314, 316 in FIG. 15 do not have to be the same resolution as the sub-images 1", 2", 3", 4" acquired by the monochromatic or panchromatic detector arrays 152, 162, 172, 182 (see FIG. 6). Therefore, the densities of photodetectors in the linear color arrays 312, 314, 316 can be more or less than the detector arrays 152, 162, 172, 183. However, it is preferred that the optical and perspective center 315 of the color sub-camera system 5 be the same as the optical and perspective centers 155, 165, 175, 185 of the sub-camera systems 1, 2, 3, 4, so its shutter should be operated in timed sequence related to travel speed, as explained above. Once the macro-image 230" is acquired and stitched together, the color sub-images acquired by linear color detector arrays 312, 314, 316 can be added by merging them together with the macro-image 230" in the same manner as described above for the large format, color, digital camera system 250 of FIGS. 10-13. It is also a feature of this invention that another sub-camera system, similar to, or the same as, sub-camera system 310 with one or more linear arrays of monochromatic, panchromatic, or even color photodetection capabilities can also be used to fill holes, spaces, or imperfections in or between the other sub-images 1", 2", 3", 4" (see FIG. 7).

Figure 16:
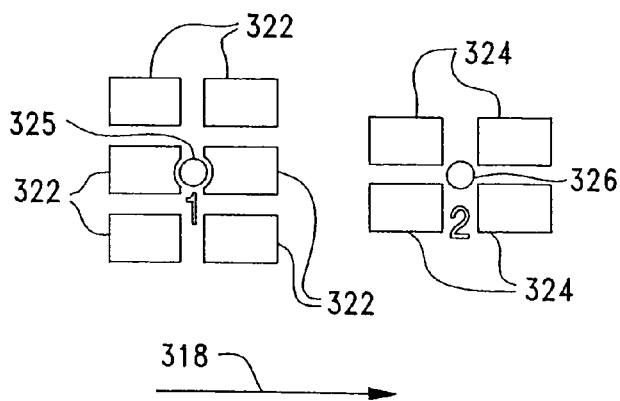
FIG. 16 is a diagrammatic view of example detector arrays of a large format, digital camera system of this invention to facilitate describing the signal processing and stitching of acquired sub-images into large format, macro-images according to this invention.

To explain the data flow, reference is made, for example, to FIG. 16, which shows two sub-camera systems 1, 2 (again, no lens systems or other camera components are shown in FIG. 16 to avoid unnecessary complexity). The sub-camera system 1 is shown, for example, with six detector arrays 322, and the sub-camera system 2 is shown, for example with four detector arrays 324. each detector array is considered to be, for example a 2,000×3,000 array. The lens are, for example, 100 mm focal length, and the distance between the lens is, for example 200 mm.

Separate respective sensor electronics modules capture and store data from each respective detector array. A respective mechanical shutter operates for each respective lens system. Integration and synchronization of all these sub-systems has to be accomplished. Overlap in flight paths is used for acquiring redundant data in marginal edge portions of adjacent macro-images, if it is desired to piece together multiple macro-images. The data flow to produce a seamless image is organized in three phases as follows.

Phase A: Calibration

A laboratory calibration will be performed for each camera before any production images are made. The calibration assesses the optical properties of the camera parts by imaging a known test field in a laboratory environment which defines where the sub images of a particular optical system go in the stitched final image. The camera produces images with each of its "n" optical systems (optical "cones"), and within each cone there are $k_i$ (i=1, . . . n) square arrays to produce image patches or sub-images. The steps used are as follows:

Independent calibration of sub-camera cone 1 and sub-camera cone 2 to determine focal length, principal X-Y point coordinates, and distortion parameters.

Determination of the position of each sensor in the image plane.

Determination of the relative position of cone 2 to cone 1.

Camera calibration is done by using a calibration object and image measurements and multi-image overlay (field calibration).

Used mathematical model: Co-linearity.

Used algorithms: bundle adjustment.

Phase B: Image Acquisition in a Moving Platform

For aerial imaging, the camera will be mounted in an airplane and images will be produced by each cone, and within each cone, with each square array (image patch or sub-image). These sub-images will be stored in a digital mass storage medium for subsequent processing.

As the airplane flies, the shutter in each cone 1, 2 will be released or actuated sequentially at carefully timed intervals related to speed of flight, so that the optical center 325, 326 of each cone 1, 2 is at the same location along the flight path when the image is taken. That means that if two cones 1, 2 are a distance of 30 centimeters apart in the direction of flight, their shutters will be released one after the other so that the airplane has flown 30 centimeters. At a speed of 70 meters per second, this would, in this example, be an interval of 4.3 milliseconds. In this manner, the geometric differences between the sub images of the two cones 1, 2 would be minimized and the sub-images all have the same optical center.

Synchronized exposure of the 6 sensor (detector) arrays 322 of cone 1 and the 4 sensor (detector) arrays 234 of cone 2.

Synchronization of the exposure between cone 1 and sub-camera cone 2 to an accuracy of +/−3 msec.

Time delay for shutter operation of sub-camera system 1 after the shutter operation of sub-camera system 2, as described above, exposes the two groups 1, 2, of detector arrays 322, 324 at the same physical position along the path of the moving vehicle (plane).

Phase C: Converting the Sub-Images into a Large Seamless "Stitched" Frame Image

Figure 17:
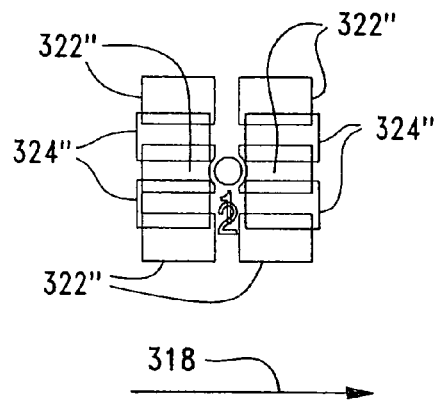
FIG. 17 illustrates one phase of the signal processing and stitching process of this invention.

A stitched output image is being produced from the many sub-images stored in the storage medium. The total number of sub-images is k1+k2+ . . . kn, if there are n optical sub-systems (cones), and in each cone i exist ki imaging arrays. FIG. 17 illustrates the basic idea of the data stitching operation. Steps are as follows:

Image processing for separate images from individual photodetectors, get transformed into a unique sub-image.

Cone 1 is selected as the master frame. Sub-images 324" of cone 2 are transformed into the gaps between sub-images 322" of cone 1.

Used mathematical models: Linear transform (2, 4, 6 parameters) and projective transform (8 parameters).

Least squares template matching, least squares adjustment.

One of the cones (e.g., cone 1) is called the "master cone" of the camera. Its sub-images 322" will be placed into the proper locations of the output image using the calibration information from Phase A. Sub-images 324" from the other n−1 cones are then used to fill in the empty spaces left by the sub-images 322" from the master cone 1. To fill in those spaces, the sub-images 324" of those secondary cones(s) 2 (or n−1) are matched geometrically and radiometrically with the sub-images 322" of the master cone 1. If any discrepancies are detected, then they are removed by geometrically resampling the secondary sub-images 324" to geometrically fit with the sub-images 322" of the master or primary cone 1. Analogously, the gray values are adjusted to fit the secondary sub-images 324" into their gray values of the sub images 322" of the master cone 1.

Figure 18:
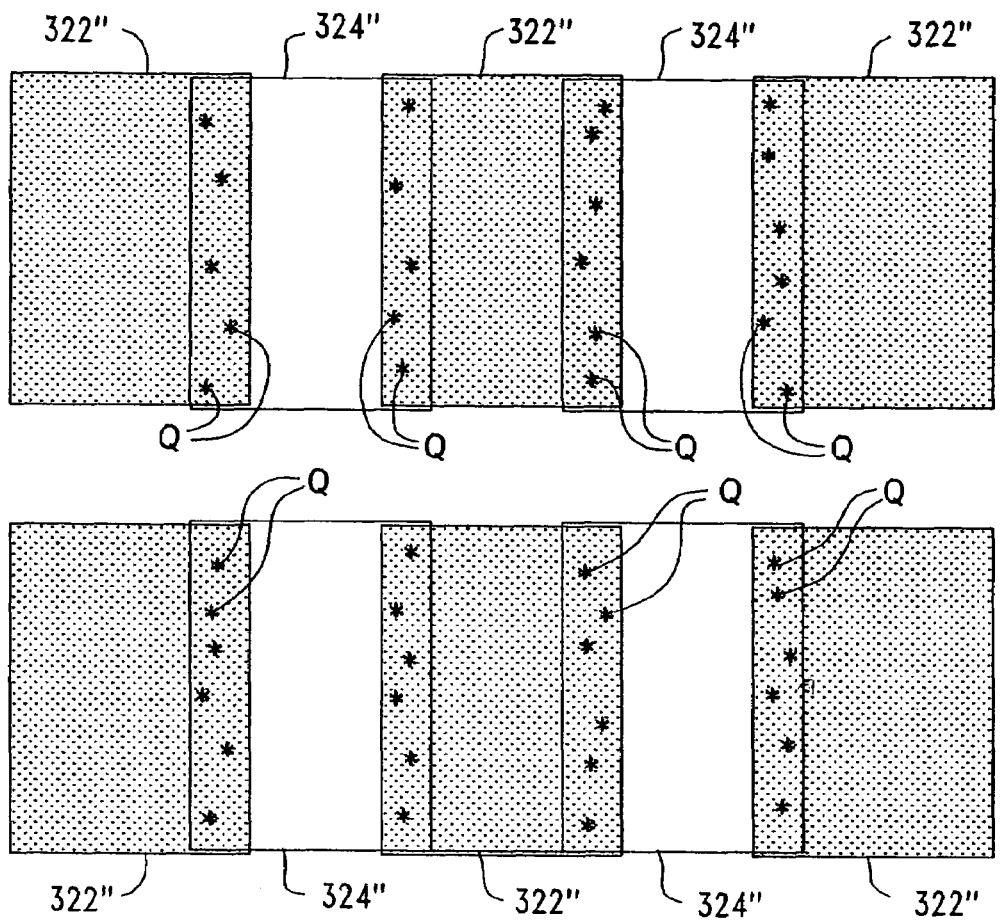
FIG. 18 illustrates another phase of the signal processing and stitching process of this invention.

The process requires that the identifiable points, so-called tie points, such as $Q_1$, $Q_1'$, $Q_2$, $Q_2'$, $Q_3$, $Q_3'$, $Q_4$, $Q_4'$, $Q_5$, $Q_5'$, $Q_6$, $Q_6'$ of FIGS. 3a-e, get defined automatically in the overlap areas of the image patches, as also shown at stars (some, but not all, of which, are labeled Q in FIG. 18.

The stitching works in the overlapping area of sub-images 322", 324". Each sub-image 324" of cone 2 is transformed into the system of cone 1 to a sub-pixel accuracy, while the fit was not sub-pixel accurate before (e.g. 4 pixels at image scale of 1/5000, speed of 70 m/sec and 3 msec delays).

Converting raw image data into large format, seamless, color frame macro-images by stitching, image analysis, and linear transformation needs, as explained above, significant computing power and a large amount of mass data storage capacity. These two qualities are combined in an intelligent image "box", which is part of the entire system of the large format digital camera. The mass storage capacity of the intelligent image "box" is used during image data acquisition to store raw image data. One or multiple digital data processors are employed to control the parallel data streams from the multiple detector arrays to the one or multiple mass storage devices during image data acquisition.

After the process of image data acquisition, the raw image data get post-processed and converted into the large format, seamless, color frame images by exploiting the computing power of the one or multiple digital data processors of the intelligent image "box". The large seamless color frame images are stored on the one or more mass data storage media of the intelligent image "box".

Figure 19:
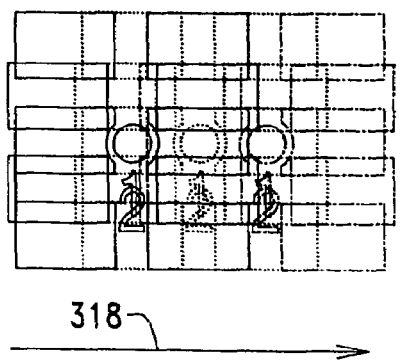
FIG. 19 illustrates a large format, macro-image comprising overlapping sub-images according to this invention.

There are two different imaging modes for the innovative cameras of this invention. The mode on board a vehicle (e.g. an aircraft) permits one to make many sub-images one after another, say at an interval of 0.5 seconds. With the airplane flying 70 meters per second, the sub-images will be taken when the camera has moved only 35 meters. Since the camera will cover perhaps a 90-degree large field-of-view, thus 500 meters from a flight altitude of 500 meters, images will be overlapping greatly. This redundancy can be used to fill in holes in the final image (see FIG. 19), and it can be used to reduce the number of sub-camera systems needed, as compared to still camera applications.

Laterally, the field-of-view is defined by the optical lens of the camera. To increase this field of view, one can use additional optical systems (cones), or use larger detector array, or use more array detector arrays in one single cone. These alternatives are supported in this innovation.

Without the kinematics from a moving platform, the motion-based (in-flight) redundancy is not available. However, a large format image can still be obtained from the multiple sub-images in multiple optical cones, as described above. The image acquisition is simpler in still camera application, since the laboratory calibration will describe all the systematic, unchanging errors in the system that need to be removed, and there are no additional errors introduced from the motion of the platform.

Figure 20:
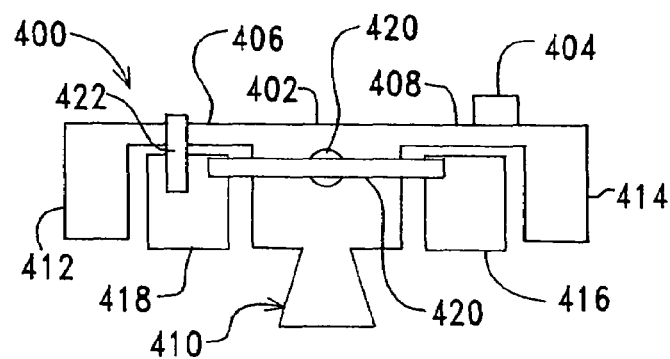
FIG. 20 illustrates a dampened camera platform apparatus with accelerometer read-outs of residual vibration and movement for use in determining whether sub-images obtained by sub-camera systems of this invention are too degraded by vibrations and/or movement for use in making a large format, macro-image.

The large format digital camera systems of this invention can be equipped with a passive platform assembly 400, as shown in FIG. 20, to minimize vibrations and to minimize movements caused by the carrier 402 of the camera 410, which may degrade the quality of the images acquired by the camera 410 (motion blur).

The camera carrier 402 of the passive platform assembly 400 is equipped with small scale acceleration sensors 404, sometimes called accelerometers, which are mounted on the camera carrier 402 in such a way that residual vibrations and movements of the camera 410 are detected over a short period of time. The signals of the small scale acceleration sensors or accelerometers 404 are transmitted to the camera control system (not shown in FIG. 20) and evaluated in such a way that a decision can be made whether a serious degration of the image quality (motion blur) caused by such residual vibrations or movements is expected or is not expected.

The camera 410 is designed in such a way that multiple exposure of detector arrays are possible within an extremely short period of time. The digital sub-images acquired by these multiple exposures will not be stored unless the evaluation of the signal of the small scale acceleration sensors 404 show no serious vibrations or movements of the camera carrier 402.

The series of multiple exposures is repeated until the evaluation of the signal of the small scale acceleration sensors 404 show that a sub-image is being acquired without quality degration due to vibrations or movements (motion blur). Such non-degraded sub-images, i.e., the last of the series, is exposed within an extremely short period of time and is stored on digital media or memory during a much longer time.

The camera carrier 402 of the platform assembly 400 has outer swingers or outriggers 406, 408 with camera 410 looking down and two masses 412, 414 connected rigidly to the respective outriggers 406, 408. Two inner masses 416, 418 are hung on an inner swinger bar 420, which is connected pivotally 422 to the camera carrier 402. A damper 424 is connected between at least outrigger 406 and at least one of the inner masses 416, 418 or to the inner swinger bar 420 to dampen any vibrations or relative movements between the camera carrier 402 and the inner masses 416, 418. Residual vibrations or relative movements in the acceleration sensor or accelerometer 404 are used as explained above.

The method of image acquisition and vibration measurement leads to the decision process mentioned above, which can be described as follows:

External signal to expose an image;
Activation of the shutter;
Reading of the accelerometer 404;
Evaluating the accelerator signal against pre-set tolerance criteria or threshold values;
Decision A: Vibration and/or movement during exposure was small or insignificant, i.e., within the tolerance or threshold criteria for acquiring good sub-images: Read out detector array process data for the sub-images being acquired and wait until new external signal to expose an image is recognized; or
Decision B: Vibration or movement during exposure is more than insignificant, i.e., outside the tolerance or threshold criteria so that unacceptable blurring or other sub-image degradation has probably occurred: Clear the detector array and repeat the steps above.

Since these and numerous other modifications and combinations of the above-described method and embodiments will readily occur to those skilled in the art, it is not desired to limit the invention to the exact construction and process shown and described above. Accordingly, resort may be made to all suitable modifications and equivalents that fall within the scope of the invention as defined by the claims which follow. The words "comprise", "comprises", "comprising", "include", "including", and "includes" when used in this specification and in the following claims are intended to specify the presence of stated feature or steps, but they do not preclude the presence or addition of one or more other features, steps, or groups thereof.

The embodiments of the invention in which an exclusive property is claimed are defined as follows:

1. A method of acquiring a large area image of a large area object, comprising:
   acquiring a plurality of small area electronic images of divers portions of the large area object by: (i) positioning at least three focusing systems with the same focal length in fixed, immovable relation to a two-dimensional array of photosensitive elements in the focal plane of the at least three focusing systems, with the focusing systems being coplanar but not aligned with each other in a straight line, wherein an optic axis of each of the three focusing systems is parallel to the respective optic axes of the other focusing systems; (ii) sequentially focusing at least three overlapping divers portions of the large area object onto the array of photosensitive elements through respective ones of the at least three focusing systems to sequentially expose the array of photosensitive elements to the at least three overlapping divers portions of the large area object; and (iii) reading electronic signals indicative of spatial and radiometric distribution of light from the overlapping divers portions of the large area object out of the photosensitive elements;
   forming a mosaic of the small area electronic images by merging the small area electronic images together in such a manner that overlapping areas of adjacent small area electronic images register with each other; and
   converting the mosaic of small area images to the large area image of the large area object.

2. The method of claim 1, wherein sequentially focusing comprises sequentially focusing the at least three focusing systems at a timing such that the respective optic axes of the at least three focusing systems are positioned over a same portion of the large area object when focused.

3. A method of acquiring a large area image of a large area object, comprising:
   acquiring a plurality of small area electronic images of divers portions of the large area object by: (i) positioning four focusing systems with the same focal length in fixed, immovable relation to a two-dimensional array of photosensitive elements in the focal plane of the four focusing systems and in a coplanar, polygon configuration so that the focusing systems are not aligned with each other in a straight line, wherein an optic axis of each of the four focusing systems is parallel to the respective optic axes of the other focusing systems; (ii) sequentially focusing four overlapping divers portions of the large area object onto the array of photosensitive elements through respective ones of the four focusing systems to sequentially expose the array of photosensitive elements to the four overlapping divers portions of the large area object; and (iii) reading electronic signals indicative of spatial and radiometric distribution of light from the four overlapping divers portions of the large area object out of the photosensitive elements;
   forming a mosaic of the small area electronic images by merging the small area electronic images together in such a manner that overlapping areas of adjacent small area electronic images register with each other; and
   converting the mosaic of small area images to the large area image of the large area object.

4. The method of claim 3, wherein sequentially focusing comprises sequentially focusing the four focusing systems at a timing such that the respective optic axes of the at least three focusing systems are positioned over a same portion of the large area object when focused.

5. Camera apparatus comprising:
   at least three focusing systems, each of which has the same focal length and is positioned to have a focal plane that is coplanar with the focal plane of each of the other focusing systems to focus at least three different, but overlapping small area portions of the large area object onto a two-dimensional array of photosensitive elements positioned in the focal plane of the focusing systems, said at least three focusing systems being coplanar but not aligned in a straight line relation to each other, wherein an optic axis of each of the focusing systems is parallel to the respective optic axes of the other focusing systems;
   a shutter on each of the focusing systems; and
   a shutter control system that actuates the respective shutters sequentially to expose the array of photosensitive elements sequentially to the respective different, but overlapping small area portions of the large area object.

6. The camera apparatus of claim 5, including four focusing systems positioned in a polygon configuration.

7. The camera apparatus of claim 5, wherein the shutter control system actuates the respective shutters of the at least three focusing systems at a timing such that the respective optic axes of the at least three focusing systems are positioned over a same portion of the large area object when the respective shutters are actuated.

* * * * *